(12) United States Patent
Ogata et al.

(10) Patent No.: US 10,388,932 B2
(45) Date of Patent: *Aug. 20, 2019

(54) LAMINATED BODY

(71) Applicant: Sumitomo Chemical Company, Limited, Tokyo (JP)

(72) Inventors: Toshihiko Ogata, Osaka (JP); Daizaburo Yashiki, Niihama (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 15/627,664

(22) Filed: Jun. 20, 2017

(65) Prior Publication Data

US 2017/0365834 A1   Dec. 21, 2017

(30) Foreign Application Priority Data

Jun. 21, 2016 (JP) .................. 2016-123053

(51) Int. Cl.
  *B05D 1/18* (2006.01)
  *B05D 1/42* (2006.01)
  (Continued)

(52) U.S. Cl.
  CPC ....... *H01M 2/1686* (2013.01); *H01M 2/1653* (2013.01); *H01M 10/0525* (2013.01);
  (Continued)

(58) Field of Classification Search
  CPC .................................................. H01M 2/1686
  See application file for complete search history.

(56) References Cited

U.S. PATENT DOCUMENTS 3,931,446 A   1/1976   Murayama et al.
5,051,183 A   9/1991   Takita et al.
(Continued)

FOREIGN PATENT DOCUMENTS

CN   1933923 A    3/2007
EP   0834941 A1   4/1998
(Continued)

OTHER PUBLICATIONS

Mohammadi et al., "Effect of Tensile Strain Rate and Elongation on Crystalline Structure and Piezoelectric Properties of PVDF Thin Films", Polymer Testing, vol. 26, pp. 42-50 (2007).
(Continued)

*Primary Examiner* — Matthew J Merkling
(74) *Attorney, Agent, or Firm* — Panitch Schwarze Belisario & Nadel LLP

(57) ABSTRACT

A nonaqueous electrolyte secondary battery separator that is not easily curled is provided by a laminated body including a porous base material containing a polyolefin-based resin and a porous layer on at least one surface of the porous base material. The difference between the white index of a surface of the porous base material after being irradiated with ultraviolet light with an intensity of 255 W/m² for 75 hours and the white index of the surface of the porous base material before irradiation is not more than 2.5. The porous layer contains a polyvinylidene fluoride-based resin which contains crystal form α in an amount of not less than 36 mol % with respect to 100 mol % of a total amount of the crystal form α and crystal form β contained in the resin.

7 Claims, 1 Drawing Sheet

(51) Int. Cl.
 *H01M 2/16* (2006.01)
 *H01M 10/0525* (2010.01)
 *H01M 10/0585* (2010.01)
(52) U.S. Cl.
 CPC ........... *H01M 10/0585* (2013.01); *B05D 1/18* (2013.01); *B05D 1/42* (2013.01)

(56) References Cited

U.S. PATENT DOCUMENTS

| | | | |
|---|---|---|---|
| 7,208,555 B2 | 4/2007 | Tada et al. | |
| 8,931,647 B2 | 1/2015 | Shiki et al. | |
| 9,508,975 B1 * | 11/2016 | Matsuo | H01M 2/1653 |
| 10,074,840 B2 | 9/2018 | Honda et al. | |
| 2006/0014912 A1 | 1/2006 | Araki et al. | |
| 2007/0072069 A1 | 3/2007 | Yamada et al. | |
| 2007/0092705 A1 | 4/2007 | Lee et al. | |
| 2007/0190334 A1 | 8/2007 | Araki et al. | |
| 2007/0232709 A1 | 10/2007 | Lee et al. | |
| 2009/0101600 A1 | 4/2009 | Shiki et al. | |
| 2009/0111025 A1 | 4/2009 | Lee et al. | |
| 2009/0148659 A1 | 6/2009 | Ishiodori et al. | |
| 2010/0285341 A1 | 11/2010 | Yun et al. | |
| 2011/0212358 A1 * | 9/2011 | Usami | B32B 5/32 |
| | | | 429/145 |
| 2011/0305940 A1 * | 12/2011 | Usami | B29C 44/04 |
| | | | 429/144 |
| 2013/0089770 A1 | 4/2013 | Nishikawa | |
| 2013/0095365 A1 | 4/2013 | Nishikawa | |
| 2013/0196208 A1 | 8/2013 | Nemoto | |
| 2014/0178741 A1 | 6/2014 | Hasegawa et al. | |
| 2014/0272505 A1 * | 9/2014 | Yoon | H01M 2/1646 |
| | | | 429/94 |
| 2014/0363726 A1 | 12/2014 | Honda et al. | |
| 2015/0180002 A1 * | 6/2015 | Nishikawa | H01M 2/1686 |
| | | | 429/144 |
| 2015/0188108 A1 | 7/2015 | Miyazawa et al. | |
| 2015/0263325 A1 | 9/2015 | Honda et al. | |
| 2017/0033347 A1 | 2/2017 | Murakami et al. | |
| 2017/0033348 A1 | 2/2017 | Murakami et al. | |
| 2017/0098809 A1 * | 4/2017 | Ogata | H01M 2/1653 |
| 2017/0141373 A1 | 5/2017 | Murakami et al. | |
| 2017/0170443 A1 | 6/2017 | Murakami et al. | |
| 2017/0365831 A1 | 12/2017 | Ogata et al. | |
| 2017/0365832 A1 | 12/2017 | Ogata et al. | |
| 2017/0365833 A1 | 12/2017 | Ogata et al. | |
| 2017/0365834 A1 | 12/2017 | Ogata et al. | |
| 2017/0365878 A1 | 12/2017 | Ogata et al. | |

FOREIGN PATENT DOCUMENTS

| | | |
|---|---|---|
| JP | S5117274 A | 2/1976 |
| JP | H06-104736 B2 | 12/1994 |
| JP | H11-40129 A | 2/1999 |
| JP | H1186844 A | 3/1999 |
| JP | H11300180 A | 11/1999 |
| JP | 2001-118558 A | 4/2001 |
| JP | 2005179562 A | 7/2005 |
| JP | 2005200623 A | 7/2005 |
| JP | 2005343957 A | 12/2005 |
| JP | 2008062229 A | 3/2008 |
| JP | 4247027 B2 | 4/2009 |
| JP | 2009104967 A | 5/2009 |
| JP | 2009185093 A1 | 8/2009 |
| JP | 2009-256404 A | 11/2009 |
| JP | 2010540744 A | 12/2010 |
| JP | 201346998 A | 3/2013 |
| JP | 5355823 B1 | 11/2013 |
| JP | 5432417 B2 | 3/2014 |
| JP | 5553165 B2 | 7/2014 |
| JP | 2015111461 A | 6/2015 |
| JP | 2016-040354 A | 3/2016 |
| JP | 2016051695 A | 4/2016 |
| JP | 5932161 B2 | 6/2016 |
| KR | 10-2006-0072065 A | 6/2006 |
| KR | 10-2006-0101541 A | 9/2006 |
| KR | 10-2006-0118668 A | 11/2006 |
| KR | 10-2009-0037552 A | 4/2009 |
| KR | 10-2013-0031319 A | 3/2013 |
| KR | 10-2013-0036043 A | 4/2013 |
| KR | 10-1430975 B1 | 8/2014 |
| KR | 10-2014-0112668 A | 9/2014 |
| KR | 10-2014-0113186 A | 9/2014 |
| KR | 101479749 B1 | 1/2015 |
| KR | 20150020667 A | 2/2015 |
| KR | 10-1510972 B1 | 4/2015 |
| KR | 10-20160002173 A | 1/2016 |
| KR | 20160038918 A | 4/2016 |
| WO | 2007119850 A1 | 10/2007 |
| WO | 2008018181 A1 | 2/2008 |
| WO | 2012137375 A1 | 10/2012 |
| WO | 2013073503 A1 | 5/2013 |
| WO | 2013099539 A1 | 7/2013 |
| WO | 2016152863 A1 | 9/2016 |

OTHER PUBLICATIONS

Office Action dated Aug. 18, 2017 in KR Application No. 10-2017-0041595.
Office Action dated Aug. 18, 2017 in KR Application No. 10-2017-0041611.
Office Action dated Aug. 18, 2017 in KR Application No. 10-2017-0041366.
Office Action dated Jul. 29, 2016 in KR Application No. 1020160077240.
Office Action dated Jun. 28, 2016 in JP Application No. 2016024163.
Office Action dated Nov. 29, 2016 in JP Application No. 2016-024163.
Office Action dated Dec. 21, 2016 in KR Application No. 10-2016-0077240.
Office Action dated Apr. 19, 2017 in KR Application No. 10-2016-0077240.
Martins et al, "Electroactive Phases of Poly(Vinylidene Fluoride): Determination, Processing, and Applications," Progress in Polymer Science, vol. 39, pp. 683-706 (2014).
Office Action dated May 16, 2017 in JP Application No. 2017033720.
Office Action dated Mar. 28, 2018 in CN Application No. 201610865635.7.
Office Action dated Oct. 22, 2018 in U.S. Appl. No. 15/627,556 by Ogata.
Office Action dated Oct. 22, 2018 in U.S. Appl. No. 15/627,671 by Ogata.
Office Action dated Aug. 18, 2017 in KR Application No. 10-2017-0041604.
Office Action dated Dec. 31, 2018 in U.S. Appl. No. 15/627,736 for Ogata.
Office Action dated Dec. 20, 2018 in U.S. Appl. No. 15/627,585 by Ogata.
Office Action dated Sep. 20, 2018 in U.S. Appl. No. 15/627,629 by Ogata.
Office Action dated Apr. 10, 2019 in U.S. Appl. No. 15/627,585, by Ogata.

* cited by examiner

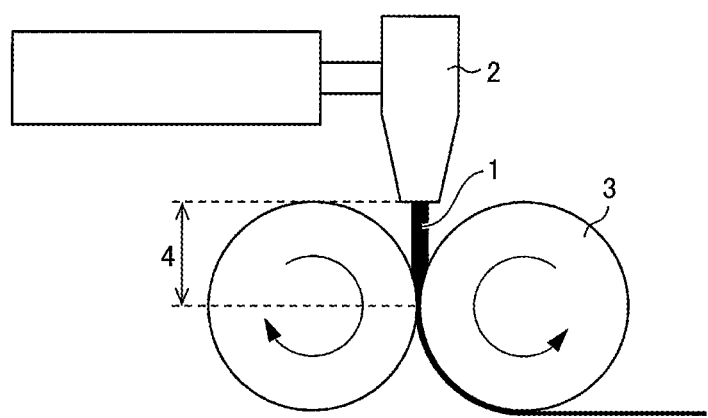

LAMINATED BODY

This Nonprovisional application claims priority under 35 U.S.C. § 119 on Patent Application No. 2016-123053 filed in Japan on Jun. 21, 2016, the entire contents of which are hereby incorporated by reference.

TECHNICAL FIELD

The present invention relates to a laminated body, and more specifically, to a laminated body usable as a separator for a nonaqueous electrolyte secondary battery (hereinafter referred to as a "nonaqueous electrolyte secondary battery separator").

BACKGROUND ART

Nonaqueous electrolyte secondary batteries such as a lithium-ion secondary battery have a high energy density, and are thus in wide use as batteries for devices such as a personal computer, a mobile telephone, and a portable information terminal. Such nonaqueous electrolyte secondary batteries have recently been developed as on-vehicle batteries.

In a nonaqueous electrolyte secondary battery, the electrodes expand and contract repeatedly as the nonaqueous electrolyte secondary battery is charged and discharged. The electrodes and the separator thus cause stress on each other. This, for example, causes the electrode active materials to fall off and consequently increases the internal resistance, unfortunately resulting in a degraded cycle characteristic. In view of that, there has been proposed a technique of coating the surface of a separator with an adhesive material such as polyvinylidene fluoride for increased adhesiveness between the separator and electrodes (see Patent Literatures 1 and 2). Coating a separator with an adhesive material, however, has been causing the separator to curl visibly. A curled separator cannot be handled easily during production, which may unfortunately lead to problems during battery preparation such as defective rolling and defective assembly.

CITATION LIST

Patent Literature

[Patent Literature 1] Japanese Patent No. 5355823 (Publication Date: Nov. 27, 2013)
[Patent Literature 2] Japanese Patent Application Publication, Tokukai, No. 2001-118558 (Publication Date: Apr. 27, 2001)

SUMMARY OF INVENTION

Technical Problem

The present invention has been accomplished in view of the above issue. It is an object of the present invention to sufficiently prevent a separator from curling.

Solution to Problem

In order to attain the above object, the inventor of the present invention has conducted diligent research and have thus discovered that a separator capable of sufficiently preventing itself from curling can be produced from a laminated body including (i) a porous base material containing a polyolefin resin as a main component and (ii) a porous layer disposed on the porous base material which porous layer contains a polyvinylidene fluoride-based resin (hereinafter also referred to as "PVDF-based resin"), the polyvinylidene fluoride-based resin having moderately controlled crystal forms. The inventor has also discovered that there is a correlation between (i) the amount of difference between the white index (hereinafter also referred to as "WI") of the porous base material before the porous base material is irradiated with ultraviolet light under predetermined conditions and the white index of the porous base material after the porous base material is irradiated with ultraviolet light under the predetermined conditions and (ii) the cycle characteristic of a nonaqueous electrolyte secondary battery to be produced. The inventor has then obtained the knowledge that the above difference amount being not more than a predetermined value makes it possible to provide a nonaqueous electrolyte secondary battery having an excellent cycle characteristic.

In order to attain the above object, a laminated body in accordance with an embodiment of the present invention includes: a porous base material containing a polyolefin-based resin as a main component; and a porous layer on at least one surface of the porous base material, the porous layer containing a polyvinylidene fluoride-based resin, the porous base material having a value of $\Delta WI$ of not more than 2.5, the $\Delta WI$ being defined in Formula (1) below, $$\Delta WI = WI_1 - WI_0 \qquad \text{Formula (1)}$$

where WI represents a white index defined in American Standard Test Methods E313, $WI_0$ represents a WI value of a surface of the porous base material which WI value is measured with use of a spectrocolorimeter before the porous base material is irradiated with ultraviolet light with an intensity of 255 W/m$^2$, and $WI_1$ represents a WI value of the surface of the porous base material which WI value is measured with use of the spectrocolorimeter after the porous base material is irradiated with ultraviolet light with an intensity of 255 W/m$^2$ for 75 hours, the polyvinylidene fluoride-based resin containing crystal form α in an amount of not less than 36 mol % with respect to 100% by mass of a total amount of the crystal form α and crystal form β contained in the polyvinylidene fluoride-based resin, where the amount of the crystal form α is calculated from an absorption intensity at around 765 cm$^{-1}$ in an IR spectrum of the porous layer, and an amount of the crystal form β is calculated from an absorption intensity at around 840 cm$^{-1}$ in the IR spectrum of the porous layer.

The laminated body in accordance with an embodiment of the present invention may preferably be arranged such that the polyvinylidene fluoride-based resin contains (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

The laminated body in accordance with an embodiment of the present invention may preferably be arranged such that the polyvinylidene fluoride-based resin has a weight-average molecular weight of not less than 200,000 and not more than 3,000,000.

The laminated body in accordance with an embodiment of the present invention may preferably be arranged such that the porous layer contains a filler.

The laminated body in accordance with an embodiment of the present invention may preferably be arranged such that the filler has a volume-average particle size of not less than 0.01 μm and not more than 10 μm.

A member for a nonaqueous electrolyte secondary battery (hereinafter referred to as a "nonaqueous electrolyte secondary battery member") in accordance with an embodiment of the present invention includes: a cathode; the laminated body; and an anode, the cathode, the laminated body, and the anode being arranged in this order.

A nonaqueous electrolyte secondary battery in accordance with an embodiment of the present invention includes the above laminated body as a separator.

Advantageous Effects of Invention

An embodiment of the present invention can prevent curls.

BRIEF DESCRIPTION OF DRAWINGS

FIG. 1 is a diagram schematically illustrating how resin is extruded and rolled for production of a sheet made of the resin.

DESCRIPTION OF EMBODIMENTS

The following description will discuss an embodiment of the present invention in detail. Note that numerical expressions such as "A to B" herein mean "not less than A and not more than B".

<Laminated Body>

A laminated body in accordance with the present embodiment includes: a porous base material containing a polyolefin-based resin as a main component; and a porous layer on at least one surface of the porous base material, the porous layer containing a polyvinylidene fluoride-based resin, (a) the porous base material having a value of $\Delta WI$ of not more than 2.5, the $\Delta WI$ being defined in Formula (1) below, $$\Delta WI = WI_1 - WI_0 \qquad \text{Formula (1)}$$

where WI represents a white index defined in American Standard Test Methods E313, $WI_0$ represents a WI value of a surface of the porous base material which WI value is measured with use of a spectrocolorimeter before the porous base material is irradiated with ultraviolet light with an intensity of 255 W/m², and $WI_1$ represents a WI value of the surface of the porous base material which WI value is measured with use of the spectrocolorimeter after the porous base material is irradiated with ultraviolet light with an intensity of 255 W/m² for 75 hours, (b) the polyvinylidene fluoride-based resin containing crystal form α in an amount of not less than 36 mol % with respect to 100 mol % of a total amount of the crystal form α and crystal form β contained in the polyvinylidene fluoride-based resin, where the amount of the crystal form α is calculated from an absorption intensity at around 765 cm⁻¹ in an IR spectrum of the porous layer, and an amount of the crystal form β is calculated from an absorption intensity at around 840 cm⁻¹ in the IR spectrum of the porous layer.

(1) Porous Base Material

A porous base material for the present embodiment is a base material for a laminated body of the present embodiment, and contains a polyolefin-based resin as a main component. A porous base material for the present embodiment is preferably a microporous film. Specifically, the porous base material preferably contains, as a main component, a polyolefin-based resin that contains pores connected to one another and that allows a gas, a liquid, or the like to pass therethrough from one surface to the other. The porous base material may include a single layer or a plurality of layers.

A porous base material containing a polyolefin-based resin as a main component means that the polyolefin-based resin component accounts for normally not less than 50% by volume, preferably not less than 90% by volume, more preferably not less than 95% by volume, of the entire porous base material. The polyolefin-based resin of the porous base material preferably contains a high molecular weight component having a weight-average molecular weight of $5 \times 10^5$ to $15 \times 10^6$. In a case where the polyolefin-based resin of the porous base material has a weight-average molecular weight of not less than 1,000,000, a nonaqueous electrolyte secondary battery separator including (i) the porous base material and (ii) a later-described porous layer preferably has a higher strength.

Examples of the polyolefin-based resin include a high molecular weight homopolymer (for example, polyethylene, polypropylene, or polybutene) or a copolymer (for example, an ethylene-propylene copolymer) produced by polymerizing, for example, ethylene, propylene, 1-butene, 4-methyl-1-pentene, or 1-hexene. The porous base material includes a layer containing only one of these polyolefin-based resins and/or a layer containing two or more of these polyolefin-based resins. The polyolefin-based resin is, in particular, preferably a high molecular weight polyethylene-based resin containing ethylene as a main component because such a polyethylene-based resin is capable of preventing (shutting down) a flow of an excessively large electric current at a lower temperature. The porous base material may contain a component(s) other than a polyolefin-based resin as long as such a component does not impair the function of the layer.

Examples of the polyethylene-based resin include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous base material has a film thickness of preferably 4 μm to 40 μm, more preferably 5 μm to 30 μm, still more preferably 6 μm to 15 μm.

The porous base material only needs to have a weight per unit area which weight is determined as appropriate in view of the strength, film thickness, weight, and handleability of the separator. Note, however, that the porous base material has a weight per unit area of preferably 4 g/m² to 20 g/m², more preferably 4 g/m² to 12 g/m², still more preferably 5 g/m² to 10 g/m², so as to allow a nonaqueous electrolyte secondary battery that includes a laminated body including the porous base material to have a higher weight energy density and a higher volume energy density.

The porous base material has an air permeability of preferably 30 sec/100 mL to 500 sec/100 mL, more preferably 50 sec/100 mL to 300 sec/100 mL, in terms of Gurley values. A porous base material having an air permeability within the above range can have sufficient ion permeability.

The porous base material has a porosity of preferably 20% by volume to 80% by volume, more preferably 30% by volume to 75% by volume, so as to (i) retain a larger amount of electrolyte and (ii) obtain the function of reliably preventing (shutting down) a flow of an excessively large electric current at a lower temperature. Further, in order to obtain sufficient ion permeability and prevent particles from entering the cathode and/or the anode, the porous base material has pores each having a pore size of preferably not larger than 0.3 μm, more preferably not larger than 0.14 μm.

A laminated body in accordance with the present embodiment includes a porous base material having a ΔWI (defined in Formula (1) above) value of not more than 2.5. WI is an indicator of a color tone (whiteness) of a sample, and is used to indicate, for example, (i) the fading characteristic of a dye or (ii) the degree of oxidation degradation in transparent or white resin being processed. A higher WI value should indicate a higher degree of whiteness.

A porous base material can be produced by, for example, (i) a method of adding a pore forming agent such as a filler or plasticizing agent to a resin such as polyolefin, shaping the resin into a sheet, then removing the pore forming agent with use of an appropriate solvent, and stretching the sheet from which the pore forming agent has been removed, or (ii) a method of adding a pore forming agent to a resin such as polyolefin, shaping the resin into a sheet, then stretching the sheet, and removing the pore forming agent from the stretched sheet.

The sheet can be produced by, for example, (i) extruding the resin (which contains a pore forming agent) from a T-die or the like and (ii) rolling the extruded resin with use of a pair of rolls into a thin film. FIG. 1 is a diagram schematically illustrating how resin is extruded and rolled for production of a sheet made of the resin. FIG. 1 shows resin 1 as a raw material for a separator, a T-die 2, rolls 3, and the distance 4 between the T-die 2 and the rolls 3.

In the later-described Comparative Production Examples 1 and 2, for example, the resin 1 had a temperature of 253° C. (Comparative Production Example 1) or 252° C. (Comparative Production Example 2) immediately before being extruded from the T-die 2, and the rolls 3 each had a surface temperature of 150° C. for the sheet production. These conditions are publicly known conditions that are normally adopted for separator production. During the above operation, the resin 1 has a high temperature while it is exposed to air from the time point at which it is extruded from the T-die 2 to the time point at which it comes into contact with the rolls 3. The resin 1 thus comes into contact with oxygen, generating an oxide of the resin 1 as a result. This oxide will cause a side reaction when the battery is charged and discharged, and will consequently decrease the life of the battery. The porous base material thus preferably contains such an oxide in as small an amount as possible.

The above oxide is faded on ultraviolet irradiation. This should mean that a porous base material contains a larger amount of the oxide in a case where there is a larger difference between the WI that the surface of the porous base material has before ultraviolet irradiation and the WI that the surface of the porous base material has after ultraviolet irradiation.

In view of the above, the inventor of the present invention conducted research on the basis of the idea that producing a laminated body including a porous base material having a small WI difference (that is, a porous base material in which oxide is contained in only a small amount) should (i) eliminate the influence of the oxide on the cycle characteristic of a battery to be produced and thus (ii) increase the life of the battery. The research has revealed that an excellent cycle characteristic is exhibited by a nonaqueous electrolyte secondary battery including, as a nonaqueous electrolyte secondary battery separator (hereinafter referred to also as "separator"), a laminated body including a porous base material having a ΔWI (defined in Formula (1) above) value of not more than 2.5.

As defined in Formula (1), ΔWI is the difference between (i) that WI value ($WI_0$) of a surface of a porous base material which is measured with use of a spectrocolorimeter before the porous base material is irradiated with ultraviolet light having an intensity of 255 W/m² and (ii) that WI value ($WI_1$) of the surface of the porous base material which is measured with use of a spectrocolorimeter after the porous base material is irradiated with ultraviolet light with an intensity of 255 W/m² for 75 hours. $WI_0$ is that WI value of the surface of the porous base material which is a value before irradiation of 255 W/m² ultraviolet light (that is, before the start of irradiation of 255 W/m² ultraviolet light).

The spectrocolorimeter is, for example, suitably a integrating-sphere spectrocolorimeter, which allows for easy and accurate WI measurement. An integrating-sphere spectrocolorimeter is a device for carrying out optical spectrometric measurement by (i) irradiating a sample with light of a xenon lamp and (ii) causing an integrating sphere that covers the vicinity of an irradiated portion of the sample to collect, in a light receiving section, light reflected from the sample. An integrating-sphere spectrocolorimeter allows for measurement of various optical parameters. Note that the spectrocolorimeter is not limited to an integrating-sphere spectrocolorimeter, and may be any spectrocolorimeter that is capable of WI measurement.

The above "surface of a porous base material" refers to that portion of the porous base material which receives light emitted by the spectrocolorimeter. The spectrocolorimeter may be used for measurement of the WI value of the surface of the porous base material as explained in the manual of the spectrocolorimeter to be used. The method for the measurement is thus not limited to any particular one. However, in order for the light receiving section of the spectrocolorimeter to easily collect light reflected by the porous base material, the porous base material is, for example, preferably placed on black paper before being irradiated with light.

The porous base material is preferably irradiated with 255 W/m² ultraviolet light with use of a device capable of continuous ultraviolet irradiation. The device can be, for example, a light resistance tester defined in JIS B 7753 or a weather resistance tester (for example, Sunshine Weather Meter S80 available from Suga Tester). The ultraviolet irradiation is carried out on a test piece for 75 hours at a relative humidity of 50% with use of (i) a sunshine carbon arc light source (with four pairs of ultra long-life carbon rods) set to have a discharge voltage of 50 V and a discharge current of 60 A and (ii) a black panel having a temperature of 60° C.

The above tester is configured such that a metal plate to which a sample has been attached is rotated around an ultraviolet lamp as the center so that the sample is continuously exposed to ultraviolet light. A weather resistance tester is capable of (i) irradiation involving use of a light source for emitting artificial light close to sunlight and (ii) intermittent water injection or (i) repetition of irradiation involving use of a light source for emitting artificial light close to sunlight and non-irradiation for darkness and (ii) spray of cold water onto the back surface of the test piece while it is dark. This makes it possible to simulate conditions for a rainy weather (high humidity). For the present embodiment, however, it is only necessary to cause the porous base material to be faded to a degree that allows for calculation of the difference between $WI_0$ and $WI_1$. Thus, it is not necessary to simulate conditions for a rainy weather (high humidity).

In a case where ΔWI defined in Formula (1) has a value of not more than 2.5, a nonaqueous electrolyte secondary battery including the porous base material has a high discharge capacity maintaining ratio of more than 70.0% even after 180 cycles of charge and discharge as demonstrated in Production Examples described later. The ΔWI value correlates to the amount of oxide contained in the porous base material as described above. Since a higher ΔWI value indicates a larger amount of oxide contained, the ΔWI value is preferably as small as possible. The ΔWI value is essentially not more than 2.5, more preferably not more than 2.3, further preferably not more than 2.2. The ΔWI value has a lower limit value of preferably not less than −10, more preferably not less than −5, most preferably 0.

A porous base material having a ΔWI value of not more than 2.5 can be produced by reducing the time period during which the resin is exposed to air while it has a high temperature in the process of producing a sheet. Referring to FIG. 1 as an example, the reduction can be achieved by, for example, (1) lowering the temperature of the resin 1 extruded from the T-die 2 (extrusion temperature), (2) increasing the rate of extruding the resin 1 to reduce the time period during which the resin 1 is in contact with oxygen, or (3) reducing the distance 4 between the T-die 2 and the rolls 3.

In view of the balance between (i) the resin 1 needing to have a high temperature for extrusion and (ii) reduction of the time period during which the resin 1 is exposed to air while it has a high temperature, the extrusion temperature in (1) above is preferably 200° C. to 250° C., more preferably 220° C. to 249° C., further preferably 240° C. to 248° C. The extrusion temperature refers to the temperature that the resin has immediately before the resin is extruded from the discharge opening (for example, a T-die) of an extruder, and equals the temperature at which the discharge opening is set.

The rate of extrusion in (2) above cannot be generalized as it also depends on the processing capability of the extruder, but is preferably 1 m/min to 10 m/min, more preferably 2 m/min to 8 m/min, further preferably 2.5 m/min to 5 m/min.

As in Comparative Example 1 described later, an extrusion temperature of higher than 250° C. tended to result in an increased amount of oxide contained in resin even with an increased rate of extrusion. Thus, setting the extrusion temperature within the above preferable range and also increasing the rate of extrusion should further reduce the amount of oxide in the porous base material.

The distance 4 in (3) above is preferably as small as possible as long as it does not prevent the operation of the rolls 3. The rolls 3 each have a surface temperature of preferably 120° C. to 160° C., more preferably 130° C. to 155° C., further preferably 140° C. to 150° C.

The above conditions are those that apply to the resin extrusion. Another effective method is (4) adding a surfactant to a solvent through which a sheet produced with use of the rolls 3 is to be passed for removal of the pore forming agent from the sheet. In a case where, for instance, the solvent is an aqueous hydrochloric acid solution, and a pore forming agent such as calcium carbonate dispersed in a sheet is to be dissolved in the aqueous solution for removal, adding a surfactant to the aqueous solution can increase the degree of permeation of the aqueous hydrochloric acid solution through the polyolefin-based resin of the sheet. This in turn allows oxide in the resin (which oxide, being an organic substance, is normally insoluble in an aqueous hydrochloric acid solution) to be dissolved more readily in the aqueous hydrochloric acid solution, thereby promoting extraction of the oxide into the aqueous hydrochloric acid solution.

The surfactant may be an anionic surfactant, a cationic surfactant, a nonionic surfactant, or an amphoteric surfactant. The surfactant is, however, preferably a nonionic surfactant as it is not easily affected by an acid or alkali. Adding the surfactant in a larger amount allows the pore forming agent to be washed away (removed) and the oxide to be removed with higher efficiency. Note, however, that adding the surfactant in too large an amount may cause the surfactant to remain in the separator. Thus, the surfactant is added in an amount of preferably not less than 0.1% by weight and not more than 15% by weight, more preferably 0.1% by weight to 10% by weight, with respect to 100% by weight of the cleaning liquid.

In a case where the solvent is water, for example, the temperature of the solvent (cleaning temperature) is not lower than 25° C. and not higher than 60° C., more preferably not lower than 30° C. and not higher than 55° C., particularly preferably not lower than 35° C. and not higher than 50° C. This is because although a higher cleaning temperature allows the pore forming agent to be removed with higher efficiency, too high a cleaning temperature will cause the cleaning liquid to evaporate. Note that the term "cleaning temperature" refers to the temperature of the cleaning liquid with which the sheet has been immersed.

The sheet having been cleaned with the solvent may further be cleaned with water. The cleaning with water is carried out at a water-cleaning temperature of preferably not lower than 25° C. and not higher than 60° C., more preferably not lower than 30° C. and not higher than 55° C., particularly preferably not lower than 35° C. and not higher than 50° C. This is because although a higher water-cleaning temperature allows the cleaning with water to be carried out with higher efficiency, too high a water-cleaning temperature will cause a cleaning liquid (water) to evaporate. Note that the term "water-cleaning temperature" refers to the temperature of the water with which the sheet has been immersed.

Using one or more methods selected from (1) to (4) above in producing a porous base material can reduce the content of oxide in the porous base material, and thus allows for production of a porous base material having a ΔWI value of not more than 2.5. In particular, it is more preferable to combine the adjustment of the extrusion temperature for the resin ((1) above) and the addition of a surfactant to the solvent ((4) above) as such a combination makes it possible to easily adjust conditions and effectively remove oxide.

Examples of the filler (pore forming agent) include, but are not particularly limited to, (i) an inorganic filler that can be dissolved in a water-based solvent containing an acid, (ii) an inorganic filler that can be dissolved in a water-based solvent containing an alkali, and (iii) an inorganic filler that can be dissolved in a water-based solvent constituted mainly by water.

Examples of the inorganic filler that can be dissolved in a water-based solvent containing an acid include calcium carbonate, magnesium carbonate, barium carbonate, zinc oxide, calcium oxide, aluminum hydroxide, magnesium hydroxide, calcium hydroxide, and calcium sulfate. Among these, calcium carbonate is preferable because an inexpensive, fine powder of calcium carbonate can be obtained easily.

Examples of the inorganic filler that can be dissolved in a water-based solvent containing an alkali include silicic acid and zinc oxide. Among these, silicic acid is preferable because an inexpensive, fine powder of silicic acid can be obtained easily.

Examples of the inorganic filler that can be dissolved in a water-based solvent constituted mainly by water include calcium chloride, sodium chloride, and magnesium sulfate.

Examples of the plasticizing agent (pore forming agent) include, but are not particularly limited to, a low molecular weight hydrocarbon such as liquid paraffin.

A laminated body in accordance with the present embodiment includes a porous base material having a ΔWI value of not more than 2.5, which means that the porous base material contains a smaller amount of oxide than conventionally publicly known separators. Thus, the use of a laminated body in accordance with the present embodiment as a nonaqueous electrolyte secondary battery separator can reduce side reactions caused during charging and discharging of the nonaqueous electrolyte secondary battery. This in turn makes it possible to provide a nonaqueous electrolyte secondary battery that exhibits an excellent cycle characteristic.

<Laminated Body>

Further, a laminated body of the present embodiment includes a publicly known porous layer(s) such as an adhesive layer, a heat-resistant layer, and a protective layer.

The porous base material is more preferably subjected to a hydrophilization treatment before a porous layer is formed, that is, before the porous base material is coated with a coating solution (described later). Performing a hydrophilization treatment on the porous base material further improves coating easiness of the coating solution and thus allows a more uniform porous layer to be formed. The hydrophilization treatment is effective in a case where water accounts for a high proportion of a solvent (dispersion medium) contained in the coating solution.

Specific examples of the hydrophilization treatment include publicly known treatments such as (i) a chemical treatment involving an acid, an alkali, or the like, (ii) a corona treatment, and (iii) a plasma treatment. Among these hydrophilization treatments, the corona treatment is more preferable because the corona treatment makes it possible to not only hydrophilize the porous base material within a relatively short time period, but also hydrophilize only a surface and its vicinity of the porous base material to leave the inside of the porous base material unchanged in quality.

(Porous Layer)

The porous layer is preferably a resin layer containing a resin. The resin in the porous layer is preferably (i) insoluble in the electrolyte of a nonaqueous electrolyte secondary battery to be produced and (ii) electrochemically stable when the nonaqueous electrolyte secondary battery is in normal use. In a case where the porous layer is disposed on one surface of the porous base material, the porous layer is disposed preferably on a surface of the porous base material which surface faces the cathode of the nonaqueous electrolyte secondary battery, more preferably on a surface of the porous base material which surface is in contact with the cathode.

The porous layer for the present embodiment contains a polyvinylidene fluoride-based resin, the polyvinylidene fluoride-based resin containing crystal form α in an amount of not less than 36 mol % with respect to 100 mol % of the total amount of the crystal form α and crystal form β contained in the polyvinylidene fluoride-based resin.

The amount of the crystal form α is calculated from an absorption intensity at around 765 $cm^{-1}$ in the IR spectrum of the porous layer, and the amount of the crystal form β is calculated from an absorption intensity at around 840 $cm^{-1}$ in the IR spectrum of the porous layer.

The porous layer for the present embodiment contains a polyvinylidene fluoride-based resin (PVDF-based resin). The porous layer contains a large number of pores connected to one another, and thus allows a gas or a liquid to pass therethrough from one surface to the other. Further, in a case where the porous layer for the present embodiment is used as a constituent member of a nonaqueous electrolyte secondary battery separator, the porous layer can be a layer capable of adhering to an electrode as the outermost layer of the separator.

Examples of the PVDF-based resin include homopolymers of vinylidene fluoride (that is, polyvinylidene fluoride); copolymers (for example, polyvinylidene fluoride copolymer) of vinylidene fluoride and other monomer(s) polymerizable with vinylidene fluoride; and mixtures of the above polymers. Examples of the monomer polymerizable with vinylidene fluoride include hexafluoropropylene, tetrafluoroethylene, trifluoroethylene, trichloroethylene, and vinyl fluoride. The present embodiment can use (i) one kind of monomer or (ii) two or more kinds of monomers selected from above. The PVDF-based resin can be synthesized through emulsion polymerization or suspension polymerization.

The PVDF-based resin contains vinylidene fluoride at a proportion of normally not less than 85 mol %, preferably not less than 90 mol %, more preferably not less than 95 mol %, further preferably not less than 98 mol %. A PVDF-based resin containing vinylidene fluoride at a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene at a proportion of more than 0 mol % and not more than 1.5 mol % or (ii) a vinylidene fluoride homopolymer (containing hexafluoropropylene at a proportion of 0 mol %).

The second resin is a vinylidene fluoride-hexafluoropropylene copolymer containing hexafluoropropylene at a proportion of more than 1.5 mol %.

A porous layer containing the two kinds of PVDF-based resins adheres better to an electrode than a porous layer not containing one of the two kinds of PVDF-based resins. Further, a porous layer containing the two kinds of PVDF-based resins adheres better to another layer (for example, the porous base material layer) included in a nonaqueous electrolyte secondary battery separator, with the result of a higher peel force between the two layers, than a porous layer not containing one of the two kinds of PVDF-based resins. The first resin and the second resin are preferably mixed at a mixing ratio (mass ratio, first resin:second resin) of 15:85 to 85:15.

The PVDF-based resin has a weight-average molecular weight of preferably 200,000 to 3,000,000. A PVDF-based resin having a weight-average molecular weight of not less than 200,000 tends to allow a porous layer to attain a mechanical property enough for the porous layer to endure a process of adhering the porous layer to an electrode, thereby allowing the porous layer and the electrode to adhere to each other sufficiently. A PVDF-based resin having a weight-average molecular weight of not more than 3,000,000 tends to not cause the coating solution, which is to be applied to form a porous layer, to have too high a viscosity, which allows the coating solution to have excellent shaping easiness. The weight-average molecular weight of the PVDF-based resin is more preferably 200,000 to 2,000,000, further preferably 500,000 to 1,500,000.

The PVDF-based resin has a fibril diameter of preferably 10 nm to 1000 nm in view of the cycle characteristic of a nonaqueous electrolyte secondary battery containing the porous layer.

The porous layer for the present embodiment may contain a resin other than the PVDF-based resin. Examples of the other resin include styrene-butadiene copolymers; homopolymers or copolymers of vinyl nitriles such as acrylonitrile and methacrylonitrile; and polyethers such as polyethylene oxide and polypropylene oxide.

The porous layer for the present embodiment may contain a filler. The filler may be an inorganic or organic filler. In a case where the porous layer for the present embodiment contains a filler, the filler is contained at a proportion of preferably not less than 1% by mass and not more than 99% by mass, more preferably not less than 10% by mass and not more than 98% by mass, with respect to the total amount of the polyvinylidene fluoride-based resin and the filler combined. Containing a filler allows a separator including the porous layer to have improved slidability and heat resistance, for example. The filler may be any inorganic or organic filler that is stable in a nonaqueous electrolyte and that is stable electrochemically. The filler preferably has a heat-resistant temperature of not lower than 150° C. to ensure safety of the battery.

Examples of the organic filler include: crosslinked polymethacrylic acid esters such as crosslinked polyacrylic acid, crosslinked polyacrylic acid ester, crosslinked polymethacrylic acid, and crosslinked polymethyl methacrylate; fine particles of crosslinked polymers such as crosslinked polysilicone, crosslinked polystyrene, crosslinked polydivinyl benzene, a crosslinked product of a styrene-divinylbenzene copolymer, polyimide, a melamine resin, a phenol resin, and a benzoguanamine-formaldehyde condensate; and fine particles of heat-resistant polymers such as polysulfone, polyacrylonitrile, polyaramid, polyacetal, and thermoplastic polyimide.

A resin (polymer) contained in the organic filler may be a mixture, a modified product, a derivative, a copolymer (a random copolymer, an alternating copolymer, a block copolymer, or a graft copolymer), or a crosslinked product of any of the molecular species listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia, and hydrates thereof; carbonates such as calcium carbonate and magnesium carbonate; sulfates such as barium sulfate and calcium sulfate; and clay minerals such as calcium silicate and talc. The inorganic filler is preferably a metal hydroxide, a hydrate of a metal oxide, or a carbonate to improve the safety of the battery, for example, to impart fire retardance. The inorganic filler is preferably a metal oxide in terms of insulation and oxidation resistance.

The present embodiment may use (i) only one filler or (ii) two or more kinds of fillers in combination. Alternatively, the organic filler(s) and the inorganic filler(s) may be used in combination.

The filler has a volume average particle size of preferably 0.01 μm to 10 μm in order to ensure (i) fine adhesion and fine slidability and (ii) shaping easiness of the laminated body. The volume average particle size has a lower limit of more preferably not less than 0.05 μm, further preferably not less than 0.1 μm. The volume average particle size has an upper limit of more preferably not more than 5 μm, further preferably not more than 1 μm.

The filler may have any shape. The filler may, for example, be a particulate filler. Example shapes of the particles include a sphere, an ellipse, a plate shape, a bar shape, and an irregular shape. In order to prevent a short circuit in the battery, the particles are preferably (i) plate-shaped particles or (ii) primary particles that are not aggregated.

The filler forms fine bumps on a surface of the porous layer, thereby improving the slidability. Thus, a filler including (i) plate-shaped particles or (ii) primary particles that are not aggregated forms finer bumps on a surface of the porous layer so that the porous layer adheres better to an electrode.

The porous layer for the present embodiment has an average thickness of preferably 0.5 μm to 10 μm, more preferably 1 μm to 5 μm, on one surface of the porous base material in order to ensure adhesion to an electrode and a high energy density.

If the porous layer has a thickness of less than 0.5 μm on one surface of the porous base material, it will be impossible to, in a case where the laminated body is included in a nonaqueous electrolyte secondary battery, sufficiently prevent an internal short circuit caused by, for example, breakage of the nonaqueous electrolyte secondary battery. Further, such a porous layer can retain only a smaller amount of electrolyte.

If the porous layer has a thickness of more than 10 μm on one surface of the porous base material, the laminated body in a nonaqueous electrolyte secondary battery will have an increased resistance to permeation of lithium ions over the entire region of the laminated body. Thus, repeating charge-and-discharge cycles will degrade the cathode of the nonaqueous electrolyte secondary battery, with the result of a degraded rate characteristic and a degraded cycle characteristic. Further, such a porous layer will increase the distance between the cathode and the anode, with the result of a larger nonaqueous electrolyte secondary battery.

In a case where the porous layer is disposed on both surfaces of the porous base material, the physical properties of the porous layer that are described below at least refer to the physical properties of the porous layer disposed on a surface of the porous base material which surface faces the cathode of the nonaqueous electrolyte secondary battery including the laminated body.

The porous layer only needs to have a weight per unit area (per one surface thereof) which weight is appropriately determined in view of the strength, film thickness, weight, and handleability of the laminated body. In a case where the laminated body is included in a nonaqueous electrolyte secondary battery, the porous layer normally has a weight per unit area of preferably 0.5 g/m$^2$ to 20 g/m$^2$, more preferably 0.5 g/m$^2$ to 10 g/m$^2$.

The porous layer which has a weight per unit area which weight falls within the above numerical range allows a nonaqueous electrolyte secondary battery including the porous layer to have a higher weight energy density and a higher volume energy density. If the weight per unit area of the porous layer is beyond the above range, a nonaqueous electrolyte secondary battery including the laminated separator will be heavy.

The porous layer has a porosity of preferably 20% by volume to 90% by volume, more preferably 30% by volume to 80% by volume, in order to achieve sufficient ion permeability. The pore diameter of the pores in the porous layer is preferably not more than 1.0 μm, more preferably not more than 0.5 µm. In a case where the pores each have such a pore diameter, a nonaqueous electrolyte secondary battery that includes a laminated body including the porous layer can achieve sufficient ion permeability.

The laminated body has an air permeability of preferably 30 sec/100 mL to 1000 sec/100 mL, more preferably 50 sec/100 mL to 800 sec/100 mL in terms of Gurley values. A laminated body having such an air permeability achieves sufficient ion permeability in a case where the laminated body is used as a member of a nonaqueous electrolyte secondary battery.

An air permeability larger than the above range means that the laminated body has a high porosity and thus has a coarse laminated structure. This may result in a separator having a lower strength and thus having an insufficient shape stability at high temperatures in particular. An air permeability smaller than the above range may, on the other hand, prevent the laminated body from having sufficient ion permeability when used as a member of a nonaqueous electrolyte secondary battery and thus degrade the battery characteristics of the nonaqueous electrolyte secondary battery.

A laminated body in accordance with the present embodiment includes a porous base material having a $\Delta$WI value of not more than 2.5 as described above, which means that the porous base material contains a smaller amount of oxide than conventionally publicly known separators. Thus, the laminated body can, similarly to the porous base material, reduce side reactions caused during charging and discharging of the nonaqueous electrolyte secondary battery. This in turn makes it possible to provide a nonaqueous electrolyte secondary battery that exhibits an excellent cycle characteristic.

<Crystal Forms of PVDF-Based Resin>

The PVDF-based resin in the porous layer for use in the present embodiment contains crystal form $\alpha$ in an amount of not less than 36 mol %, preferably not less than 63 mol %, more preferably not less than 70 mol %, further preferably not less than 80 mol %, with respect to 100 mol % of the total amount of crystal form $\alpha$ and crystal form $\beta$ contained. Further, the amount of crystal form $\alpha$ is preferably not more than 95 mol %. Containing crystal form $\alpha$ in an amount of not less than 36 mol % allows a laminated body including the porous layer to be used as a member of a nonaqueous electrolyte secondary battery such as a nonaqueous electrolyte secondary battery separator that is not easily curled.

A porous layer for use in the present embodiment is usable as a member of a nonaqueous electrolyte secondary battery which member is not easily curled for the following reason.

A laminated body of the present embodiment can prevent itself from curling presumably because, for example, (a) a smaller content of the PVDF-based resin having crystal form $\beta$, which PVDF-based resin strongly adheres to the porous base material, allows the porous layer to be deformed to only a moderately smaller degree in response to deformation of the porous base material and/or (b) a larger content of the PVDF-based resin having crystal form $\alpha$, which PVDF-based resin is high in rigidity, allows the porous layer to be more resistant to deformation.

The PVDF-based resin having crystal form $\alpha$ is arranged such that in the PVDF skeleton contained in the polymer of the PVDF-based resin, with respect to a fluorine atom (or a hydrogen atom) bonded to a single main-chain carbon atom in the molecular chains contained in the PVDF skeleton, one adjacent carbon atom is bonded to a hydrogen atom (or a fluorine atom) having a trans position relative to the above fluorine atom (or the above hydrogen atom), and the other (opposite) adjacent carbon atom is bonded to a hydrogen atom (or a fluorine atom) having a gauche position (positioned at an angle of 60°) relative to the above fluorine atom (or the above hydrogen atom), wherein two or more such conformations are chained consecutively as follows:

$$\text{(TGT}\overline{\text{G}}\text{ structure)} \quad \text{[Math. 1]}$$

and the molecular chains each have the following type:

$$\text{TGT}\overline{\text{G}} \quad \text{[Math. 2]}$$

wherein the respective dipole moments of C—$F_2$ and C—$H_2$ bonds each have a component perpendicular to the molecular chain and a component parallel to the molecular chain.

The PVDF-based resin having crystal form $\alpha$ has characteristic peaks (characteristic absorptions) at around 1,212 $cm^{-1}$, around 1,183 $cm^{-1}$, and around 765 $cm^{-1}$ in its IR spectrum. The PVDF-based resin having crystal form $\alpha$ has characteristic peaks at around $2\theta=17.7°$, around $2\theta=18.3°$, and around $2\theta=19.9°$ in a powder X-ray diffraction analysis.

The PVDF-based resin having crystal form $\beta$ is arranged such that in the PVDF skeleton contained in the polymer of the PVDF-based resin, a main-chain carbon atom in the molecular chains contained in the PVDF skeleton is adjacent to two carbon atoms bonded to a fluorine atom and a hydrogen atom, respectively, having a trans conformation (TT-type conformation), that is, the fluorine atom and the hydrogen atom bonded respectively to the two adjacent carbon atoms are positioned at an angle of 180° to the direction of the carbon-carbon bond.

The PVDF-based resin having crystal form $\beta$ may be arranged such that the polymer of the PVDF-based resin contains a PVDF skeleton that has a TT-type conformation in its entirety. The PVDF-based resin having crystal form $\beta$ may alternatively be arranged such that a portion of the PVDF skeleton has a TT-type conformation and that the PVDF-based resin having crystal form $\beta$ has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii) the respective dipole moments of C—$F_2$ and C—$H_2$ bonds each have a component perpendicular to the molecular chain.

The PVDF-based resin having crystal form $\beta$ has characteristic peaks (characteristic absorptions) at around 1,274 $cm^{-1}$, around 1,163 $cm^{-1}$, and around 840 $cm^{-1}$ in its IR spectrum. The PVDF-based resin having crystal form $\beta$ has a characteristic peak at around $2\theta=21°$ in a powder X-ray diffraction analysis.

A PVDF-based resin having crystal form $\gamma$ is arranged such that the polymer of the PVDF-based resin contains a PVDF skeleton that has a conformation in which TT-type conformations and TG-type conformations appear consecutively and alternately. The PVDF-based resin having crystal form $\gamma$ has characteristic peaks (characteristic absorptions) at around 1,235 $cm^{-1}$ and around 811 $cm^{-1}$ in its IR spectrum. The PVDF-based resin having crystal form $\gamma$ has a characteristic peak at around $2\theta=18°$ in a powder X-ray diffraction analysis.

<Method for Calculating Content Rates of Crystal Form $\alpha$ and Crystal Form $\beta$ in PVDF-Based Resin>

The respective content rates of crystal form $\alpha$ and crystal form $\beta$ in the PVDF-based resin can be calculated by, for example, the methods (i) to (iii) below.

(i) Calculation Formula

Law of Beer: $A=\varepsilon bC$ \hfill (1)

where A represents an absorbance, ε represents a molar extinction coefficient, b represents an optical path length, and C represents a concentration.

Assuming that on the basis of the above formula (1), $A^\alpha$ represents the absorbance of the characteristic absorption of crystal form α, $A^\beta$ represents the absorbance of the characteristic absorption of crystal form β, $\varepsilon^\alpha$ represents the molar extinction coefficient of the PVDF-based resin having crystal form α, $\varepsilon^\beta$ represents the molar extinction coefficient of the PVDF-based resin having crystal form β, $C^\alpha$ represents the concentration of the PVDF-based resin having crystal form α, and $C^\beta$ represents the concentration of the PVDF-based resin having crystal form β, the respective proportions of the respective absorbances of crystal form α and crystal form β are expressed as follows:

$$A^\beta/A^\alpha = (\varepsilon^\beta/\varepsilon^\alpha) \times (C^\beta/C^\alpha) \tag{1a}$$

Assuming that a correction factor $(\varepsilon^\beta/\varepsilon^\alpha)$ for the molar extinction coefficient is $E^{\beta/\alpha}$, the content rate $F(\beta)=(C^\beta/(C^\alpha+C^\beta))$ of the PVDF-based resin having crystal form β with respect to the crystal form α and crystal form β combined is expressed by the following formula (2a):

$$F(\beta) = \{(1/E^{\beta/\alpha}) \times (A^\alpha/A^\beta)\}/\{1 + (1/E^{\beta/\alpha}) \times (A^\alpha/A^\beta)\} \tag{2a}$$
$$= A^\beta / \{(E^{\beta/\alpha} \times A^\alpha) + A^\beta\}$$

Thus, in a case where the correction factor $E^{\beta/\alpha}$ is determined, the content rate F(β) of the PVDF-based resin having crystal form β with respect to the crystal form α and crystal form β combined can be calculated from an actual measurement of the absorbance $A^\alpha$ of the characteristic absorption of crystal form α and an actual measurement of the absorbance $A^\beta$ of the characteristic absorption of crystal form β. Further, the content rate F(α) of the PVDF-based resin having crystal form α with respect to the crystal form α and crystal form β combined can be calculated from F((β) calculated as above.

(ii) Method for Determining Correction Factor $E^{\beta/\alpha}$

A sample of a PVDF-based resin having only crystal form α is mixed with a sample of a PVDF-based resin having only crystal form β for preparation of a sample with a known content rate F((β) of the PVDF-based resin having crystal form β. The IR spectrum of the prepared sample is measured. Then, measurements are made of the absorbance (peak height) $A^\alpha$ of the characteristic absorption of crystal form α and the absorbance (peak height) $A^\beta$ of the characteristic absorption of crystal form β in the IR spectrum measured above.

Subsequently, $A^\alpha$ and $A^\beta$ are substituted into the formula (3a) below, into which the formula (2a) is solved for $E^{\beta/\alpha}$, to determine a correction factor $E^{\beta/\alpha}$.

$$E^{\beta/\alpha} = \{A^\beta \times (1-F(\beta))\}/(A^\alpha \times F(\beta)) \tag{3a}$$

Measurements are made of respective IR spectrums of a plurality of samples having respective mixing ratios different from each other. The respective correction factors $E^{\beta/\alpha}$ of the plurality of samples are determined by the above method, and the average of the correction factors $E^{\beta/\alpha}$ is then calculated.

(iii) Calculation of Respective Content Rates of Crystal Form α and Crystal Form β in Sample For each sample, the content rate F(α) of the PVDF-based resin having crystal form α with respect to the crystal form α and crystal form β combined is calculated on the basis of the average correction factor $E^{\beta/\alpha}$ calculated in (ii) above and the result of measurement of the IR spectrum of the sample.

Specifically, the content rate F(α) is calculated as follows: A laminated body including the above porous layer is prepared by a preparation method described later. A portion of the laminated body is cut out for preparation of a measurement sample. Then, the infrared absorption spectrum of the measurement sample at wave numbers from 4000 $cm^{-1}$ to 400 $cm^{-1}$ (measurement range) is measured at room temperature (approximately 25° C.) with use of an FT-IR spectrometer (available from Bruker Optics K.K. model: ALPHA Platinum-ATR) with a resolution of 4 $cm^{-1}$ and 512 times of scanning. The measurement sample cut out is preferably in the shape of an 80 mm×80 mm square. The size and shape of the measurement sample are, however, not limited to that; the measurement sample simply needs to be so sized as to allow its infrared absorption spectrum to be measured. Then, from the spectrum measured, the absorption intensity ($A^\alpha$) at 765 $cm^{-1}$ (characteristic absorption of crystal form α) and the absorption intensity ($A^\beta$) at 840 $cm^{-1}$ (characteristic absorption of crystal form β) are determined. The starting point and end point of a waveform formed with the wave number set as a peak are connected with a straight line, where the length between the straight line and the peak wave number (peak top) denote an absorption intensity. For crystal form α, a maximum possible absorption intensity within the wave number range of 775 $cm^{-1}$ to 745 $cm^{-1}$ is assumed to be the absorption intensity ($A^\alpha$) at 765 $cm^{-1}$. For crystal form β, a maximum possible absorption intensity within the wave number range of 850 $cm^{-1}$ to 815 $cm^{-1}$ is assumed to be the absorption intensity ($A^\beta$) at 840 $cm^{-1}$. Note that the content rate F(α) of crystal form α herein is calculated on the assumption of the average correction factor $E^{\beta/\alpha}$ being 1.681 (with reference to Japanese Patent Application Publication, Tokukai, No. 2005-200623). The calculation uses the following formula (4a):

$$F(\alpha)(\%) = [1-\{\text{absorption intensity}(A^\beta) \text{ at } 840 \text{ cm}^{-1}/ (\text{absorption intensity } (A^\alpha) \text{ at } 765 \text{ cm}^{-1} \times \text{correction factor } (E^{\beta/\alpha})(1.681) + \text{absorption intensity } (A^\beta) \text{ at } 840 \text{ cm}^{-1})\}] \times 100 \tag{4a}$$

[Method for Producing Porous Layer and Method for Producing Laminated Body]

A porous layer and laminated body for the present embodiment may each be produced by any production method, and may each be produced by any of various methods.

In an example method, a porous layer containing a PVDF-based resin and optionally a filler is formed, through one of the processes (1) to (3) below, on a surface of a polyolefin-based resin microporous film to be a porous base material. In the case of the process (2) or (3), a porous layer deposited is dried for removal of the solvent. In the processes (1) to (3), the coating solution, in the case of production of a porous layer containing a filler, preferably contains a filler dispersed therein and a PVDF-based resin dissolved therein.

The coating solution for use in a method for producing a porous layer for the present embodiment can be prepared normally by (i) dissolving, in a solvent, a resin to be contained in the porous layer for the present embodiment and (ii) dispersing, in the solvent, fine particles to be contained in the porous layer for the present embodiment.

(1) A process of (i) coating a surface of a porous base material with a coating solution containing fine particles of a PVDF-based resin to be contained in a porous layer and optionally fine particles of a filler and (ii) drying the surface of the porous base material to remove the solvent (dispersion medium) from the coating solution for formation of a porous layer.

(2) A process of (i) coating a surface of a porous base material with a coating solution containing fine particles of a PVDF-based resin to be contained in a porous layer and optionally fine particles of a filler and then (ii) immersing the porous base material into a deposition solvent (which is a poor solvent for the PVDF-based resin) for deposition of a porous layer containing the PVDF-based resin and optionally the filler.

(3) A process of (i) coating a surface of a porous base material with a coating solution containing fine particles of a PVDF-based resin to be contained in a porous layer and optionally fine particles of a filler and then (ii) making the coating solution acidic with use of a low-boiling-point organic acid for deposition of a porous layer containing the PVDF-based resin and optionally the filler.

The solvent (dispersion medium) in the coating solution may be any solvent that does not adversely affect the porous base material, that allows a PVDF-based resin to be dissolved or dispersed therein uniformly and stably, and that allows a filler to be dispersed therein uniformly and stably. Examples of the solvent (dispersion medium) include N-methylpyrrolidone, N,N-dimethylacetamide, N,N-dimethylformamide, acetone, and water.

The deposition solvent can be, for example, another solvent (hereinafter also referred to as "solvent X") that is dissolvable in the solvent (dispersion medium) contained in the coating solution and that does not dissolve the PVDF-based resin contained in the coating solution. The solvent (dispersion medium) can be efficiently removed from the coating solution by (i) immersing, in the solvent X, a porous base material to which the coating solution has been applied and on which a coating film has been formed, for replacement of the solvent (dispersion medium) in the coating film on the porous base material or a support with the solvent X and then (ii) evaporating the solvent X. The deposition solvent is preferably isopropyl alcohol or t-butyl alcohol, for example.

For the process (3), the low-boiling-point organic acid can be, for example, paratoluene sulfonic acid or acetic acid.

The coating solution may be prepared by any method that allows the coating solution to satisfy conditions such as the resin solid content (resin concentration) and the fine-particle amount that are necessary to produce a desired porous layer. Specific examples of the method for preparing a coating solution include a mechanical stirring method, an ultrasonic dispersion method, a high-pressure dispersion method, and a media dispersion method. The fine particles may be dispersed in the solvent (dispersion medium) with use of a conventionally publicly known dispersing device such as a three-one motor, a homogenizer, a media-type dispersing device, or a pressure-type dispersing device. Further, the coating solution may be prepared simultaneously with wet grinding of fine particles by supplying into a wet grinding device a liquid in which a resin is dissolved or swollen or an emulsified liquid of a resin during wet grinding carried out to produce fine particles having a desired average particle diameter. In other words, the wet grinding of fine particles and the preparation of a coating solution may be carried out simultaneously in a single step. The coating solution may contain an additive(s) such as a dispersing agent, a plasticizing agent, a surface active agent, and a pH adjusting agent as a component(s) other than the resin and the fine particles as long as such an additive does not prevent an object of the present invention from being attained. The additive may be added in an amount that does not prevent an object of the present invention from being attained.

The coating solution may be applied to the porous base material by any method, that is, a porous layer may be formed by any method on a surface of a porous base material that may have been subjected to a hydrophilization treatment as necessary. In a case where a porous layer is disposed on each of both surfaces of the porous base material, (i) a sequential deposition method may be used, in which a porous layer is formed on one surface of the porous base material, and another porous layer is subsequently formed on the other surface of the porous base material, or (ii) a simultaneous deposition method may be used, in which porous layers are formed simultaneously on both surfaces of the porous base material. A porous layer can be formed (that is, a laminated body can be produced) by, for example, (i) a method of applying the coating solution directly to a surface of the porous base material and then removing the solvent (dispersion medium), (ii) a method of applying the coating solution to an appropriate support, removing the solvent (dispersion medium) for formation of a porous layer, then pressure-bonding the porous layer to the porous base material, and peeling the support off, (iii) a method of applying the coating solution to a surface of an appropriate support, then pressure-bonding the porous base material to that surface, then peeling the support off, and then removing the solvent (dispersion medium), or (iv) a method of immersing the porous base material into the coating solution for dip coating and then removing the solvent (dispersion medium). The thickness of the porous layer can be controlled by adjusting, for example, the thickness of the coating film in a wet state (wet) after the coating, the weight ratio between the resin and the fine particles, and the solid content concentration (that is, the sum of the resin concentration and the fine-particle concentration) of the coating solution. The support can be, for example, a resin film, a metal belt, or a drum.

The coating solution may be applied to the porous base material or support by any method that can achieve a necessary weight per unit area and a necessary coating area. The coating solution can be applied by a conventionally publicly known method. Specific examples include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, and a spray coating method.

The solvent (dispersion medium) is typically removed by a drying method. Examples of the drying method include natural drying, air-blow drying, heat drying, and drying under reduced pressure. The solvent (dispersion medium) can, however, be removed by any method that allows the solvent (dispersion medium) to be removed sufficiently. The solvent (dispersion medium) contained in the coating solution may be replaced with another solvent before a drying operation. The solvent (dispersion medium) can be replaced with another solvent for removal by, for example, a method of (i) preparing another solvent (hereinafter referred to as "solvent X") that dissolves the solvent (dispersion medium) contained in the coating solution and that does not dissolve the resin contained in the coating solution, (ii) immersing the porous base material or support, to which the coating solution has been applied and on which a coating film has been formed, into the solvent X to replace the solvent (disperse medium) in the coating film on the porous base material or support with the solvent X, and (iii) evaporating the solvent X. This method allows the solvent (dispersion medium) to be removed efficiently from the coating solution. In a case where the coating film, formed on the porous base material or support by applying the coating solution thereto, is heated when removing the solvent (dispersion medium) or solvent X from the coating film, the coating film is desirably heated at a temperature that does not decrease the air permeability of the porous base material, specifically within a range of 10° C. to 120° C., preferably within a range of 20° C. to 80° C., to prevent pores in the porous base material from contracting to decrease the air permeability of the porous base material.

The solvent (dispersion medium) is preferably removed by, in particular, a method of applying the coating solution to a base material and then drying the base material for formation of a porous layer. This arrangement makes it possible to produce a porous layer having a smaller porosity variation and fewer wrinkles.

The above drying can be carried out with the use of a normal drying device.

The porous layer normally has, on one surface of the porous base material, an applied amount (weight per unit area) within a range of preferably 0.5 g/m$^2$ to 20 g/m$^2$, more preferably 0.5 g/m$^2$ to 10 g/m$^2$, preferably 0.5 g/m$^2$ to 1.5 g/m$^2$, in terms of the solid content in view of adhesiveness to an electrode and ion permeability. This means that the amount of the coating solution to be applied to the porous base material is preferably adjusted so that the porous layer in a laminated body or nonaqueous electrolyte secondary battery separator to be produced has an applied amount (weight per unit area) within the above range.

In a case where an additional layer such as a heat-resistant layer is to be disposed on the laminated body, such a heat-resistant layer can be disposed by a method similar to the above method except that the resin for the porous layer is replaced with a resin for the heat-resistant layer.

The present embodiment is arranged such that in any of the processes (1) to (3), changing the amount of resin for a porous layer which resin is to be dissolved or dispersed in a solution can adjust the volume of resin that is contained per square meter of a porous layer having undergone immersion in an electrolyte solution and that has absorbed the electrolyte solution.

Further, changing the amount of solvent in which the resin for the porous layer is to be dissolved or dispersed can adjust the porosity and average pore diameter of a porous layer having undergone immersion in an electrolyte solution.

<Method for Controlling Crystal Forms of PVDF-Based Resin>

A laminated body in accordance with the present embodiment is produced while adjustment is made of the drying conditions (for example, the drying temperature, and the air velocity and direction during drying) and/or the deposition temperature (that is, the temperature at which a porous layer containing a PVDF-based resin is deposited with use of a deposition solvent or a low-boiling-point organic acid) for the above-described method to control the crystal forms of the PVDF-based resin to be contained in a porous layer to be formed. Specifically, a laminated body of the present embodiment can be produced while the drying conditions and the deposition temperature are adjusted so that the PVDF-based resin contains crystal form $\alpha$ in an amount of not less than 36 mol % (preferably not less than 63 mol %, more preferably not less than 70 mol %, further preferably not less than 80 mol %; preferably not more than 95 mol %) with respect to 100 mol % of the total amount of the crystal form $\alpha$ and crystal form $\beta$ contained.

The drying conditions and the deposition temperature, which are adjusted so that the PVDF-based resin contains crystal form $\alpha$ in an amount of not less than 36 mol % with respect to 100 mol % of the total amount of the crystal form $\alpha$ and crystal form $\beta$ contained, may be changed as appropriate in correspondence with, for example, the method for producing a porous layer, the kind of solvent (dispersion medium) to be used, the kind of deposition solvent to be used, and/or the kind of low-boiling-point organic acid to be used.

In a case where a deposition solvent is not used and the coating solution is simply dried as in the process (1), the drying conditions may be changed as appropriate in correspondence with, for example, the amount of the solvent in the coating solution, the concentration of the PVDF-based resin in the coating solution, the amount of the filler (if contained), and/or the amount of the coating solution to be applied. In a case where a porous layer is to be formed through the process (1) described above, it is preferable that the drying temperature be 30° C. to 100° C., that the direction of hot air for drying be perpendicular to a porous base material or electrode sheet to which the coating solution has been applied, and that the velocity of the hot air be 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that the drying temperature is 40° C. to 100° C., that the direction of hot air for drying is perpendicular to a porous base material or electrode sheet to which the coating solution has been applied, and that the velocity of the hot air is 0.4 m/s to 40 m/s.

In a case where a porous layer is to be formed through the process (2) described above, it is preferable that the deposition temperature be −25° C. to 60° C. and that the drying temperature be 20° C. to 100° C. Specifically, in a case where a porous layer is to be formed through the above-described process (2) with use of N-methylpyrrolidone as the solvent for dissolving a PVDF-based resin and isopropyl alcohol as the deposition solvent, it is preferable that the deposition temperature be −10° C. to 40° C. and that the drying temperature be 30° C. to 80° C.

<Nonaqueous Electrolyte Secondary Battery Member and Nonaqueous Electrolyte Secondary Battery>

A nonaqueous electrolyte secondary battery in accordance with the present embodiment includes the above laminated body as a separator. More specifically, a nonaqueous electrolyte secondary battery in accordance with the present embodiment includes a member for a nonaqueous electrolyte secondary battery (hereinafter referred to as a "nonaqueous electrolyte secondary battery member") which member includes a cathode, the above laminated body, and an anode that are arranged in this order. The nonaqueous electrolyte secondary battery member is also encompassed in the scope of the present invention. The description below deals with a lithium-ion secondary battery as an example of the nonaqueous electrolyte secondary battery. The components of the nonaqueous electrolyte secondary battery other than a separator are not limited to those described below.

A nonaqueous electrolyte secondary battery in accordance with the present embodiment can include a nonaqueous electrolyte containing, for example, an organic solvent and a lithium salt dissolved therein. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use only one kind of the above lithium salts or two or more kinds of the above lithium salts in combination.

It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte include carbonates such as ethylene carbonate, propylene carbonate, dimethyl carbonate, diethyl carbonate, ethyl methyl carbonate, 4-trifluoromethyl-1,3-dioxolane-2-one, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents prepared by introducing a fluorine group into the organic solvents described above. The present embodiment may use only one kind of the above organic solvents or two or more kinds of the above organic solvents in combination.

Among the above organic solvents, carbonates are preferable. A mixed solvent of a cyclic carbonate and an acyclic carbonate or a mixed solvent of a cyclic carbonate and one of ethers is further preferable.

The mixed solvent of a cyclic carbonate and an acyclic carbonate is further preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

The cathode is normally a sheet-shaped cathode including (i) a cathode mix containing a cathode active material, an electrically conductive material, and a binder and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni.

Among such lithium complex oxides, (i) a lithium complex oxide having an α-$NaFeO_2$ structure such as lithium nickelate and lithium cobaltate and (ii) a lithium complex oxide having a spinel structure such as lithium manganese spinel are preferable because such lithium complex oxides have a high average discharge potential. The lithium complex oxide may further contain any of various metallic elements, and is further preferably complex lithium nickelate.

Further, the complex lithium nickelate particularly preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic for use in a high-capacity battery. Among others, an active material that contains Al or Mn and that contains Ni at a proportion of not less than 85 mol %, further preferably not less than 90 mol %, is particularly preferable because a nonaqueous electrolyte secondary battery including a cathode containing the above active material has an excellent cycle characteristic for use as a high-capacity battery. Al or Mn is contained at a proportion of 0.1 mol % to 20 mol %, and Ni is contained at a proportion of not less than 85 mol %, further preferably not less than 90 mol %, with respect to the sum of the number of moles of Al or Mn and the number of moles of Ni in the lithium nickelate. Further, the total of mol % of Al or Mn and mol % of Ni is 100 mol %.

Examples of the electrically conductive material include carbonaceous materials such as natural graphite, artificial graphite, cokes, carbon black, pyrolytic carbons, carbon fiber, and a fired product of an organic polymer compound. The present embodiment may use (i) only one kind of the above electrically conductive materials or (ii) two or more kinds of the above electrically conductive materials in combination, for example a mixture of artificial graphite and carbon black.

Examples of the binder include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, a thermoplastic polyimide, polyethylene, and polypropylene; an acrylic resin; and styrene-butadiene rubber. The binder functions also as a thickening agent.

The cathode mix may be prepared by, for example, a method of applying pressure to the cathode active material, the electrically conductive material, and the binder on the cathode current collector or a method of using an appropriate organic solvent so that the cathode active material, the electrically conductive material, and the binder are in a paste form.

Examples of the cathode current collector include electric conductors such as Al, Ni, and stainless steel. Among these, Al is preferable as it is easy to process into a thin film and less expensive.

The sheet-shaped cathode may be produced, that is, the cathode mix may be supported by the cathode current collector, through, for example, a method of applying pressure to the cathode active material, the electrically conductive material, and the binder on the cathode current collector to form a cathode mix thereon or a method of (i) using an appropriate organic solvent so that the cathode active material, the electrically conductive material, and the binder are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

The anode is normally a sheet-shaped anode including (i) an anode mix containing an anode active material and (ii) an anode current collector supporting the anode mix thereon. The sheet-shaped anode preferably contains the above electrically conductive material and binder.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped and dedoped with lithium ions at an electric potential lower than that for the cathode; metals such as aluminum (Al), lead (Pb), tin (Sn), bismuth (Bi), or silicon (Si), each of which is alloyed with alkali metal; an intermetallic compound (AlSb, $Mg_2Si$, $NiSi_2$) of a cubic system in which intermetallic compound alkali metal can be inserted in voids in a lattice; and a lithium nitrogen compound ($Li_3$-$xM_xN$ (where M represents a transition metal)).

Among the above anode active materials, a carbonaceous material containing a graphite material such as natural graphite or artificial graphite as a main component is preferable, an anode active material which is a mixture of a graphite material and silicon and in which the ratio of Si to C is not less than 5% is more preferable, and an anode active material in which the ratio of Si to C is not less than 10% is further preferable. This is because such a carbonaceous material has high electric potential flatness and low average discharge potential and can thus be combined with a cathode to achieve high energy density. The anode active material, in other words, contains Si at a proportion of more preferably not less than 5 mol %, further preferably not less than 10 mol %, with respect to the sum (100 mol %) of the number of moles of C in the graphite material and the number of moles of Si.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel. Among these, Cu is preferable as it is not easily alloyed with lithium in the case of a lithium-ion secondary battery in particular and is easily processed into a thin film.

The sheet-shaped anode may be produced, that is, the anode mix may be supported by the anode current collector, through, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The above paste preferably includes a conductive aid and binder.

A nonaqueous electrolyte secondary battery in accordance with the present embodiment may be produced by (i) arranging the cathode, the laminated body, and the anode in this order to form a nonaqueous electrolyte secondary battery member, (ii) inserting the nonaqueous electrolyte secondary battery member into a container that is for use as a housing of the nonaqueous electrolyte secondary battery, (iii) filling the container with a nonaqueous electrolyte, and (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery may be produced by any method, and may be produced by a conventionally publicly known method.

A nonaqueous electrolyte secondary battery in accordance with the present embodiment includes, as a separator, a laminated body including (i) a porous base material having a $\Delta$WI value of not more than 2.5 as described above and (ii) the above-described porous layer. The laminated body contains only a small amount of oxide of resin, which oxide can cause side reactions during charging and discharging. The nonaqueous electrolyte secondary battery can thus exhibit an excellent cycle characteristic. In Production Examples described later, for example, a nonaqueous electrolyte secondary battery including the porous base material showed a high discharge capacity maintaining ratio of more than 70.0%. A nonaqueous electrolyte secondary battery including the laminated body should also show a similar discharge capacity maintaining ratio.

The discharge capacity maintaining ratio is the ratio of (i) the discharge capacity that a nonaqueous electrolyte secondary battery has after the nonaqueous electrolyte secondary battery, which had not been subjected to a charge-and-discharge cycle, was subjected to predetermined charge-and-discharge cycles to (ii) the initial discharge capacity. A higher discharge capacity maintaining ratio means a more excellent cycle characteristic, that is, a longer life for the battery. Note that a method for calculating the discharge capacity maintaining ratio will be described later in the Examples section.

In a case where a discharge capacity maintaining ratio calculated in accordance with Formula (3) described later in <Method for measuring various physical properties, etc. of porous base material> is not less than 70.0%, the battery has a long life and thus has a sufficient cycle characteristic. A nonaqueous electrolyte secondary battery member of the present embodiment and a nonaqueous electrolyte secondary battery of the present embodiment each include the above-described porous layer, which contains a polyvinylidene fluoride-based resin (PVDF-based resin), the PVDF-based resin containing crystal form $\alpha$ in an amount of not less than 36 mol % with respect to 100 mol % of the total amount of the crystal form $\alpha$ and crystal form $\beta$ contained. The nonaqueous electrolyte secondary battery member in accordance with the present embodiment and the nonaqueous electrolyte secondary battery in accordance with the present invention are not easily curled as a result.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

The following description will discuss an embodiment of the present invention in greater detail with reference to Examples and Comparative Example. Note, however, that the present invention is not limited to the Examples and Comparative Example below.

<Method for Measuring Various Physical Properties, etc. of Porous Base Material>

The physical properties and the like of separators and porous layers in the Examples and Comparative Examples were measured by methods described below.

(1) Film Thickness (Unit: μm)

The film thickness was measured with use of a high-accuracy digital length measuring machine available from Mitsutoyo Corporation.

(2) Porosity (Unit: %)

An 8 cm square was cut from a film, and the weight W (g) and thickness D (cm) of the square were measured. The respective weights of materials in the sample were calculated. The weight Wi (g) of each material was divided by the absolute specific gravity for calculation of the volume of the material. The porosity (volume %) of the sample was determined in accordance with the following formula:

Porosity(volume %)=100−[{($W1$/absolute specific gravity 1)+($W2$/absolute specific gravity 2)+ . . . +($Wn$/absolute specific gravity $n$)}/(8× 8×$D$)]×100

(3) Weather Resistance Test

A test piece of each of the porous base materials (separators) produced in the Production Examples and Comparative Production Examples was irradiated with ultraviolet light with use of Sunshine Weather Meter S80 (available from Suga Tester) in conformity with JIS B 7753. Specifically, the test piece was irradiated with ultraviolet light with an intensity of 255 W/m$^2$ for 75 hours at a relative humidity of 50% with use of (i) a sunshine carbon arc light source (with four pairs of ultra long-life carbon rods) set to have a discharge voltage of 50 V and a discharge current of 60 A and (ii) a black panel having a temperature of 60° C.

(4) Measurement of White Index (WI)

The WI value of each separator was measured by Specular Component Included (SCI) method (including specular reflection) with use of a spectrocolorimeter (CM-2002, available from MINOLTA). During the measurement of the WI value, the separator was placed on black paper (available from Hokuetsu Kishu Paper Co., Ltd., colored high-quality paper, black, thickest type, shirokuhan (788 mm×1091 mm with the long side extending in a machine direction)). WI measurements were made ($WI_0$ and $WI_1$, respectively) before and after the separator was subjected to the above weather resistance test, and ΔWI was then determined in accordance with Formula (1) above.

(5) Measurement of Discharge Capacity Maintaining Ratio

Nonaqueous electrolyte secondary batteries each of which had not been subjected to a charge-and-discharge cycle were each subjected to three cycles of initial charge and discharge. Each of the three cycles of the initial charge and discharge was carried out at 25° C., at a voltage ranging from 4.1 V to 2.7 V, and at an electric current value of 0.2 C. Note that the value of an electric current at which a battery rated capacity defined as a one-hour rate discharge capacity is discharged in one hour is assumed to be 1 C. This applies also to the following descriptions. Subsequently, the nonaqueous electrolyte secondary batteries were each subjected to three cycles of charge and discharge at each of the electric current values of 1 C, 5 C, 10 C, and 20 C.

Finally, the nonaqueous electrolyte secondary batteries were each subjected to three cycles of charge and discharge at an electric current value of 0.2 C. The discharge capacity maintaining ratio after 18 cycles was calculated in accordance with the following Formula (2):

Discharge capacity maintaining ratio(%) after 18 cycles=(Discharge capacity at 0.2 C in 18th cycle/discharge capacity at 0.2 C in first cycle)×100    (2)

Further, the discharge capacity maintaining ratio after 180 cycles was calculated in accordance with the following Formula (3):

Discharge capacity maintaining ratio(%) after 180 cycles=(Discharge capacity at 0.2 C in 18th cycle/discharge capacity at 0.2 C in first cycle)$^{10}$×100    (3)

PRODUCTION EXAMPLES

<Production of Separator>

Production Example 1

Polyethylene powder (ultra-high molecular weight polyethylene GUR2024 [available from Ticona Corporation]; weight-average molecular weight: 4,970,000) and low molecular weight polyethylene powder (polyethylene wax FNP-0115 [available from Nippon Seiro Co., Ltd.]) having a weight-average molecular weight of 1000 were mixed for preparation of a resin mixture containing the polyethylene powder at a proportion of 68% by weight and the low molecular weight polyethylene powder at a proportion of 32% by weight. Then, 100 parts by weight of the resin mixture, calcium carbonate (available from Maruo Calcium Co., Ltd.; average particle diameter: 0.10 μm) at a proportion of 160 parts by weight with respect to 100 parts by weight of the resin mixture, and an antioxidant at a proportion of 3 parts by weight (IRG1010 [available from Ciba Specialty Chemicals]/Irf168 [available from Ciba Specialty Chemicals]=2 parts by weight/1 part by weight) were mixed. The resulting mixture was melted and kneaded at 200° C. with use of a twin screw kneading extruder. This produced a resin composition.

The resin composition was extruded from a T-die having a temperature of 240° C. into a sheet shape, and the resulting product was rolled with use of a pair of rolls each having a surface temperature of 150° C. This prepared a sheet. The resin composition was exposed to air for 3.6 seconds (after the resin composition was discharged from the T-die until it was cooled with the rolls [that is, until it came into contact with the rolls]). In all of the Production Examples and Comparative Production Examples, the same extruder was used, and the distance between the T-die and the rolls (corresponding to the distance 4 shown in FIG. 1) was 15 cm.

This sheet was immersed in an aqueous hydrochloric acid solution (containing 4 mol/L of hydrochloric acid and 1% by weight of nonionic surfactant [SANMORIN 11, available from Sanyo Chemical Industries, Ltd.]) having a temperature of 40° C. for removal of the calcium carbonate. Subsequently, the sheet was stretched 6-fold at 100° C. with use of a tenter uniaxial stretching machine available from Ichikin Co., Ltd. This produced a separator 1 (polyolefin porous base material).

Production Example 2

Polyethylene powder (ultra-high molecular weight polyethylene GUR4032 [available from Ticona Corporation]; weight-average molecular weight: 4,970,000) and low molecular weight polyethylene powder (polyethylene wax FNP-0115 [available from Nippon Seiro Co., Ltd.]) were mixed for preparation of a resin mixture containing the polyethylene powder at a proportion of 70% by weight and the low molecular weight polyethylene powder at a proportion of 30% by weight. Then, 100 parts by weight of the resin mixture, calcium carbonate (available from Maruo Calcium Co., Ltd.; average particle diameter: 0.10 μm) at a proportion of 160 parts by weight with respect to 100 parts by weight of the resin mixture, and an antioxidant at a proportion of 3 parts by weight (IRG1010/Irf168=2 parts by weight/1 part by weight) were mixed. The resulting mixture was melted and kneaded at 200° C. with use of a twin screw kneading extruder. This produced a resin composition.

The resin composition was extruded from a T-die having a temperature of 247° C. into a sheet shape, and the resulting product was rolled with use of a pair of rolls each having a surface temperature of 150° C. This prepared a sheet. The resin composition was exposed to air for 3.0 seconds (after the resin composition was discharged from the T-die until it was cooled with the rolls).

This sheet was immersed in an aqueous hydrochloric acid solution (containing 4 mol/L of hydrochloric acid and 6% by weight of nonionic surfactant) having a temperature of 40° C. for removal of the calcium carbonate. Subsequently, the sheet was stretched 6-fold at 105° C. with use of a tenter uniaxial stretching machine available from Ichikin Co., Ltd. This produced a separator 2 (polyolefin porous base material).

Comparative Production Example 1

Polyethylene powder (ultra-high molecular weight polyethylene GUR4032 [available from Ticona Corporation]; weight-average molecular weight: 4,970,000) and low molecular weight polyethylene powder (polyethylene wax FNP-0115 [available from Nippon Seiro Co., Ltd.]) were mixed for preparation of a resin mixture containing the polyethylene powder at a proportion of 71% by weight and the low molecular weight polyethylene powder at a proportion of 29% by weight. Then, 100 parts by weight of the resin mixture, calcium carbonate (available from Maruo Calcium Co., Ltd.; average particle diameter: 0.10 μm) at a proportion of 160 parts by weight with respect to 100 parts by weight of the resin mixture, and an antioxidant at a proportion of 3 parts by weight (IRG1010/Irf168=2 parts by weight/1 part by weight) were mixed. The resulting mixture was melted and kneaded at 200° C. with use of a twin screw kneading extruder. This produced a resin composition.

The resin composition was extruded from a T-die having a temperature of 253° C. into a sheet shape, and the resulting product was rolled with use of a pair of rolls each having a surface temperature of 150° C. This prepared a sheet. The resin composition was exposed to air for 2.3 seconds (after the resin composition was discharged from the T-die until it was cooled with the rolls).

This sheet was immersed in an aqueous hydrochloric acid solution (containing 4 mol/L of hydrochloric acid and 1% by weight of nonionic surfactant) having a temperature of 40° C. for removal of the calcium carbonate. Subsequently, the sheet was stretched 7-fold at 100° C. with use of a tenter uniaxial stretching machine available from Ichikin Co., Ltd. This produced a comparative separator 1 (polyolefin porous base material).

Comparative Production Example 2

Polyethylene powder (ultra-high molecular weight polyethylene GUR4032 [available from Ticona Corporation]; weight-average molecular weight: 4,970,000) and low molecular weight polyethylene powder (polyethylene wax FNP-0115 [available from Nippon Seiro Co., Ltd.]) were mixed for preparation of a resin mixture containing the polyethylene powder at a proportion of 70% by weight and the low molecular weight polyethylene powder at a proportion of 30% by weight. Then, 100 parts by weight of the resin mixture, calcium carbonate (available from Maruo Calcium Co., Ltd.; average particle diameter: 0.10 μm) at a proportion of 160 parts by weight with respect to 100 parts by weight of the resin mixture, and an antioxidant at a proportion of 3 parts by weight (IRG1010/Irf168=2 parts by weight/1 part by weight) were mixed. The resulting mixture was melted and kneaded at 200° C. with use of a twin screw kneading extruder. This produced a resin composition.

The resin composition was extruded from a T-die having a temperature of 252° C. into a sheet shape, and the resulting product was rolled with use of a pair of rolls each having a surface temperature of 150° C. This prepared a sheet. The resin composition was exposed to air for 3.6 seconds (after the resin composition was discharged from the T-die until it was cooled with the rolls).

This sheet was immersed in an aqueous hydrochloric acid solution (containing 4 mol/L of hydrochloric acid and 6% by weight of nonionic surfactant) having a temperature of 40° C. for removal of the calcium carbonate. Subsequently, the sheet was stretched 6-fold at 105° C. with use of a tenter uniaxial stretching machine available from Ichikin Co., Ltd. This produced a comparative separator 2 (polyolefin porous base material).

<Preparation of Nonaqueous Electrolyte Secondary Battery>

Next, nonaqueous electrolyte secondary batteries were produced by the following method with use of the separators 1 and 2 and comparative separators 1 and 2, which were prepared in the Production Examples and Comparative Production Examples.

(Cathode)

A commercially available cathode produced by applying, to an aluminum foil, a mixture of 92 parts by weight of $LiNi_{0.5}Mn_{0.3}Co_{0.2}O_2$ (cathode active material), 5 parts by weight of an electrically conductive material, and 3 parts by weight of polyvinylidene fluoride (PVDF) was used to prepare a nonaqueous electrolyte secondary battery. The aluminum foil was partially cut off so that a cathode active material layer was present in an area of 40 mm×35 mm and that that area was surrounded by an area with a width of 13 mm in which area no cathode active material layer was present. The cutoff was used as a cathode. The cathode active material layer had a thickness of 58 μm and a density of 2.50 g/cm$^3$.

(Anode)

A commercially available anode was used that was produced by applying, to a copper foil, a mixture of 98 parts by weight of graphite as an anode active material, 1 part by weight of a styrene-1,3-butadiene copolymer, and 1 part by weigh of sodium carboxymethylcellulose. The copper foil was partially cut off so that an anode active material layer was present in an area of 50 mm×40 mm and that that area was surrounded by an area with a width of 13 mm in which area no anode active material layer was present. The cutoff was used as an anode. The anode active material layer had a thickness of 49 μm and a density of 1.40 g/cm$^3$.

(Assembly)

The cathode, the separator (separator 1 or 2, or comparative separator 1 or 2), and the anode were laminated (disposed) in this order in a laminate pouch, so that a nonaqueous electrolyte secondary battery member was obtained. During this operation, the cathode and the anode were arranged so that the cathode active material layer of the cathode had a main surface that was entirely covered by the main surface of the anode active material layer of the anode.

Subsequently, the nonaqueous electrolyte secondary battery member was put into a bag made of a laminate of an aluminum layer and a heat seal layer. Further, 0.25 mL of nonaqueous electrolyte was put into the bag. The nonaqueous electrolyte was an electrolyte at 25° C. prepared by dissolving $LiPF_6$ with a concentration of 1.0 mole per liter in a mixed solvent of ethyl methyl carbonate, diethyl carbonate, and ethylene carbonate in a volume ratio of 50:20:30. Then, the bag was heat-sealed while the pressure inside the bag was reduced, so that nonaqueous electrolyte secondary batteries 1 and 2 (which included the separators 1 and 2, respectively) and comparative nonaqueous electrolyte secondary batteries 1 and 2 (which included the comparative separators 1 and 2, respectively) were prepared.

Production Examples 1 and 2 and Comparative Examples 1 and 2

In Production Examples 1 and 2, the discharge capacity maintaining ratio after 180 cycles was determined of each of the nonaqueous electrolyte secondary batteries 1 and 2 (which included the separators 1 and 2, respectively). In Comparative Examples 1 and 2, the discharge capacity maintaining ratio after 180 cycles was determined of each of the comparative nonaqueous electrolyte secondary batteries 1 and 2 (which included the comparative separators 1 and 2, respectively). Table 1 shows the results.

In Table 1, the items "Extrusion temperature", "Air exposure time period", and "Surfactant concentration" indicate conditions under which a separator was produced in each of the Production Examples and Comparative Production Examples, the conditions being described above under [Production Examples]. The item "Surfactant concentration" refers to the concentration of a nonionic surfactant in an aqueous hydrochloric acid solution.

In Table 1, the items "Film thickness", "Porosity" and "ΔWI" indicate the thickness, porosity, and ΔWI that the separator of each of the Production Examples and Comparative Examples was designed to have.

Production Examples 1 and 2, respectively, and 253° C. and 252° C. in Comparative Production Examples 1 and 2, respectively.

Production Examples 1 and 2 each used a separator containing resin having been exposed to air at a temperature lower than the temperature at which resin was exposed to air in Comparative Examples 1 and 2 as described above. Such separators 1 and 2 each had a ΔWI value of not more than 2.5, which presumably allowed the nonaqueous electrolyte secondary batteries 1 and 2 to each exhibit an excellent cycle characteristic.

Comparative Production Examples 1 and 2, on the other hand, each used an extrusion temperature of higher than 250° C. This should have (i) increased the amount of oxide in resin after the resin was extruded until it came into contact with rolls and (ii) lead the produced separators to each have a ΔWI value of more than 2.5, with the result that the nonaqueous electrolyte secondary batteries 1 and 2 (which included one of the separators) each had an insufficient discharge capacity maintaining ratio of less than 70.0%.

While Comparative Production Example 1 had an air exposure time period of 2.3 seconds, which was the shortest among all the Production Examples and Comparative Production Examples, Comparative Production Example 1 used an extrusion temperature of 253° C. A high extrusion temperature of higher than 250° C. presumably more than offset the advantage of the short air exposure time period.

[Various Methods for Measuring Physical Properties of Laminated Body]

In Examples 1 to 7 and Comparative Examples 3 and 4 below, properties such as the α rate and curl property were measured by the following methods:

(6) Method for Calculating α Rate

An α rate (%) was measured by the method below, the α rate (%) being a molar ratio (%) of crystal form α in the PVDF-based resin contained in the porous layer in the

TABLE 1

| | Extrusion temperature (° C.) | Air exposure time period (seconds) | Surfactant concentration (wt %) | Film thickness (μm) | Porosity (%) | ΔWI | Discharge capacity maintaining ratio (%) after 180 cycles |
|---|---|---|---|---|---|---|---|
| Production Example 1 | 240 | 3.6 | 1 | 11 | 37 | 2.19 | 70.7 |
| Production Example 2 | 247 | 3.0 | 6 | 16 | 52 | 2.16 | 70.9 |
| Comparative Example 1 | 253 | 2.3 | 1 | 12 | 50 | 3.26 | 69.4 |
| Comparative Example 2 | 252 | 3.6 | 6 | 16 | 65 | 2.79 | 67.8 |

Table 1 shows that the nonaqueous electrolyte secondary batteries 1 and 2 (which included the separators 1 and 2, respectively, each having a ΔWI value of not more than 2.5) each had a discharge capacity maintaining ratio after 180 cycles of more than 70.0%, indicating a good cycle characteristic. In contrast, the comparative nonaqueous electrolyte secondary batteries 1 and 2 (which included the comparative separators 1 and 2, respectively, each having a ΔWI value of more than 2.5) each had a discharge capacity maintaining ratio after 180 cycles of less than 70.0%. Such a discharge capacity maintaining ratio of less than 70.0% indicates an insufficient cycle characteristic for the battery to have a long life.

As shown in Table 1, the temperature at which the resin was extruded from the T-die was 240° C. and 247° C. in laminated body produced in each of Examples 1 to 7 and Comparative Examples 3 and 4 below with respect to the total amount of the crystal form α and crystal form β contained in the PVDF-based resin.

An 80 mm×80 mm square was cut out from the laminated body. The infrared absorption spectrum of the cutout at wave numbers from 4000 $cm^{-1}$ to 400 $cm^{-1}$ (measurement range) was measured at room temperature (approximately 25° C.) with use of an FT-IR spectrometer (available from Bruker Optics K.K.; model: ALPHA Platinum-ATR) with a resolution of 4 $cm^{-1}$ and 512 times of scanning. Then, from the spectrum measured, the absorption intensity at 765 $cm^{-1}$ (characteristic absorption of crystal form α) and the absorption intensity at 840 $cm^{-1}$ (characteristic absorption of crystal form β) were determined. The starting point and end point of a waveform formed with the wave number set as a peak were connected with a straight line, where the length between the straight line and the peak wave number (peak top) denoted an absorption intensity. For crystal form α, a maximum possible absorption intensity within the wave number range of 775 cm$^{-1}$ to 745 cm$^{-1}$ was assumed to be the absorption intensity at 765 cm. For crystal form β, a maximum possible absorption intensity within the wave number range of 850 cm$^{-1}$ to 815 cm$^{-1}$ was assumed to be the absorption intensity at 840 cm$^{-1}$.

The α rate was calculated as described above in accordance with the Formula (4a) below on the basis of a value obtained by (i) determining the absorption intensity at 765 cm$^{-1}$ corresponding to crystal form α and the absorption intensity at 840 cm$^{-1}$ corresponding to crystal form β and (ii) multiplying the absorption intensity of crystal form α by 1.681 (correction factor) with reference to Japanese Patent Application Publication, Tokukai, No. 2005-200623.

$$\alpha\ rate(\%) = [1 - \{\text{absorption intensity at 840 cm}^{-1} / (\text{absorption intensity at 765 cm}^{-1} \times \text{correction factor (1.681)} + \text{absorption intensity at 840 cm}^{-1})\}] \times 100 \quad (4a)$$

(7) Curl Measurement

An 8 cm×8 cm square was cut out from the laminated body. The cutout was kept at room temperature (approximately 25° C.) and at a dew point of −30° C. for one (1) day. The appearance of the cutout was then evaluated on the basis of the following criterion: The rate "C" represents a state of a complete curl, the rates "A" and "B" each represent a better state, and the rate "A" represents the most preferable state.

A: No curved ends
B: Although an end(s) is curved, the remaining portion is mostly not curved and is flat.
C: Opposite ends curved into a tube shape

Example 1

An N-methyl-2-pyrrolidone (hereinafter referred to also as "NMP") solution (available from Kureha Corporation; product name: L#9305, weight-average molecular weight: 1,000,000) containing a PVDF-based resin (polyvinylidene fluoride-hexafluoropropylene copolymer) was prepared as a coating solution. The coating solution was applied by a doctor blade method to the porous base material produced in Production Example 1 so that the applied coating solution weighed 6.0 g per square meter of the PVDF-based resin in the coating solution. The porous film, to which the coating solution had been applied, was immersed into 2-propanol while the coating film was wet with the solvent, and was then left to stand still at 25° C. for 5 minutes. This produced a laminated porous base material (1-i). The laminated porous base material (1-i) produced was further immersed into other 2-propanol while the laminated porous base material (1-i) was wet with the above immersion solvent, and was then left to stand still at 25° C. for 5 minutes. This produced a laminated porous base material (1-ii). The laminated porous base material (1-ii) produced was dried at 65° C. for 5 minutes. This produced a laminated body (1). Table 2 shows the results of evaluation of the laminated body (1) produced.

Example 2

A laminated body (2) was prepared by a method similar to the method used in Example 1 except that the porous base material prepared in Production Example 2 was used. Table 2 shows the results of evaluation of the laminated body (2) produced.

Example 3

A porous film to which a coating solution had been applied as in Example 1 was immersed into 2-propanol while the coating film was wet with the solvent, and was then left to stand still at 0° C. for 5 minutes. This produced a laminated porous base material (3-i). The laminated porous base material (3-i) produced was further immersed into other 2-propanol while the laminated porous base material (3-i) was wet with the above immersion solvent, and was then left to stand still at 25° C. for 5 minutes. This produced a laminated porous base material (3-ii). The laminated porous base material (3-ii) produced was dried at 30° C. for 5 minutes. This produced a laminated body (3). Table 2 shows the results of evaluation of the laminated body (3) produced.

Example 4

A porous film to which a coating solution had been applied as in Example 2 was treated by a method similar to the method used in Example 3. This produced a laminated body (4). Table 2 shows the results of evaluation of the laminated body (4) produced.

Example 5

A porous film to which a coating solution had been applied as in Example 1 was immersed into 2-propanol while the coating film was wet with the solvent, and was then left to stand still at −5° C. for 5 minutes. This produced a laminated porous base material (5-i). The laminated porous base material (5-i) produced was further immersed into other 2-propanol while the laminated porous base material (5-i) was wet with the above immersion solvent, and was then left to stand still at 25° C. for 5 minutes. This produced a laminated porous base material (5-ii). The laminated porous base material (5-ii) produced was dried at 30° C. for 5 minutes. This produced a laminated body (5). Table 2 shows the results of evaluation of the laminated body (5) produced.

Example 6

A porous film to which a coating solution had been applied as in Example 2 was treated by a method similar to the method used in Example 5. This produced a laminated body (6). Table 2 shows the results of evaluation of the laminated body (6) produced.

Example 7

A porous film to which a coating solution had been applied as in Example 2 was immersed into 2-propanol while the coating film was wet with the solvent, and was then left to stand still at −10° C. for 5 minutes. This produced a laminated porous base material (7-i). The laminated porous base material (7-i) produced was further immersed into other 2-propanol while the laminated porous base material (7-i) was wet with the above immersion solvent, and was then left to stand still at 25° C. for 5 minutes. This produced a laminated porous base material (7-ii). The laminated porous base material (7-ii) produced was dried at 30° C. for 5 minutes. This produced a laminated body (7). Table 2 shows the results of evaluation of the laminated body (7) produced.

Comparative Example 3

A porous film to which a coating solution had been applied as in Example 1 was immersed into 2-propanol while the coating film was wet with the solvent, and was then left to stand still at −78° C. for 5 minutes. This produced a laminated porous base material (8-i). The laminated porous base material (8-i) produced was further immersed into other 2-propanol while the laminated porous base material (8-i) was wet with the above immersion solvent, and was then left to stand still at 25° C. for 5 minutes. This produced a laminated porous base material (8-ii). The laminated porous base material (8-ii) produced was dried at 30° C. for 5 minutes. This produced a laminated body (8). Table 2 shows the results of evaluation of the laminated body (8) produced.

Comparative Example 4

A porous film to which a coating solution had been applied as in Example 2 was treated by a method similar to the method used in Comparative Example 3. This produced a laminated body (9). Table 2 shows the results of evaluation of the laminated body (9) produced.

TABLE 2

| | α rate (%) | Curl measurement |
|---|---|---|
| Example 1 | 100 | A |
| Example 2 | 100 | A |
| Example 3 | 84 | A |
| Example 4 | 87 | A |
| Example 5 | 63 | A |
| Example 6 | 74 | A |
| Example 7 | 36 | B |
| Comparative Example 3 | 21 | C |
| Comparative Example 4 | 27 | C |

[Results]

For the laminated bodies (1) to (7), which were produced in Examples 1 to 7 and each of which included a porous layer containing a PVDF-based resin that contained crystal form α in an amount (α rate) of not less than 36% with respect to the crystal form α and crystal form β combined, the measurement results show that curls were prevented. On the other hand, for the laminated bodies (8) and (9), which were produced in Comparative Examples 8 and 9 and for each of which the α rate was less than 36%, the measurement results show that clear curls occurred.

The above indicates that the laminated body of each of Examples 1 to 7 which laminated body has an α rate of not less than 36% is not easily curled.

The cycle characteristic of a nonaqueous electrolyte secondary battery including a laminated body depends on the ΔWI value of that laminated body. The ΔWI value of such a laminated body in turn depends mainly on the ΔWI value of the porous base material included therein. The laminated bodies produced in Examples 1 to 7 were each produced with use of the porous base material produced in one of Production Examples 1 and 2. As shown in Table 1, a nonaqueous electrolyte secondary battery including the porous base material produced in any of Production Examples 1 to 3 showed a good cycle characteristic. It follows that a nonaqueous electrolyte secondary battery including the laminated body produced in any of Examples 1 to 7 understandably each showed a good cycle characteristic as well.

The results of Production Examples, Examples, and Comparative Examples described above show that the laminated bodies produced in Examples 1 to 7 can each impart an excellent cycle characteristic to a nonaqueous electrolyte secondary battery including the laminated body as a separator and are not easily curled.

INDUSTRIAL APPLICABILITY

The present invention is widely applicable in industrial fields involving use of nonaqueous electrolyte secondary batteries such as personal computers, mobile telephones, and mobile information terminals.

REFERENCE SIGNS LIST

1 Resin
2 T-die
3 Roll
4 Distance between T-die and rolls

The invention claimed is:

1. A laminated body, comprising:
a porous base material containing a polyolefin-based resin as a main component; and
a porous layer on at least one surface of the porous base material, the porous layer containing a polyvinylidene fluoride-based resin,
the porous base material having a value of ΔWI of not more than 2.5, the ΔWI being defined in Formula (1) below, $$\Delta WI = WI_1 - WI_0 \quad \text{Formula (1)}$$

where
WI represents a white index defined in American Standard Test Methods E313,
$WI_0$ represents a WI value of a surface of the porous base material which WI value is measured with use of a spectrocolorimeter before the porous base material is irradiated with ultraviolet light with an intensity of 255 W/m$^2$, and
$WI_1$ represents a WI value of the surface of the porous base material which WI value is measured with use of the spectrocolorimeter after the porous base material is irradiated with ultraviolet light with an intensity of 255 W/m$^2$ for 75 hours,
the polyvinylidene fluoride-based resin containing crystal form α in an amount of not less than 36 mol % with respect to 100 mol % of a total amount of the crystal form α and crystal form β contained in the polyvinylidene fluoride-based resin,
where the amount of the crystal form α is calculated from an absorption intensity at around 765 cm$^{-1}$ in an IR spectrum of the porous layer, and an amount of the crystal form β is calculated from an absorption intensity at around 840 cm$^{-1}$ in the IR spectrum of the porous layer.

2. The laminated body according to claim 1, wherein the polyvinylidene fluoride-based resin contains (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

3. The laminated body according to claim 1, wherein the polyvinylidene fluoride-based resin has a weight-average molecular weight of not less than 200,000 and not more than 3,000,000.

4. The laminated body according to claim 1, wherein the porous layer contains a filler.

5. The laminated body according to claim 4, wherein the filler has a volume-average particle size of not less than 0.01 μm and not more than 10 μm.

6. A nonaqueous electrolyte secondary battery member, comprising: a cathode; a laminated body according to claim 1; and an anode, the cathode, the laminated body, and the anode being arranged in this order.

7. A nonaqueous electrolyte secondary battery, comprising as a separator a laminated body according to claim 1.

* * * * *